US008891132B2

(12) United States Patent
Nakano

(10) Patent No.: US 8,891,132 B2
(45) Date of Patent: Nov. 18, 2014

(54) IMAGE PROCESSING APPARATUS FOR PRINTING A COPY FORGERY INHIBITED PATTERN USING DIFFERENT VALUES WHEN IN A COLOR SAVING MODE

(71) Applicant: Canon Kabushiki Kaisha, Tokyo (JP)

(72) Inventor: Toshimitsu Nakano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/098,906

(22) Filed: Dec. 6, 2013

(65) Prior Publication Data
US 2014/0168711 A1    Jun. 19, 2014

(30) Foreign Application Priority Data

Dec. 18, 2012  (JP) .................................. 2012-275785

(51) Int. Cl.
*G06K 15/00*    (2006.01)
*H04N 1/40*     (2006.01)
(52) U.S. Cl.
CPC .......... *G06K 15/4095* (2013.01); *G06K 15/407* (2013.01)
USPC ............................ 358/2.1; 358/3.28; 382/100
(58) Field of Classification Search
USPC ......... 358/3.28, 1.14; 382/100, 232; 380/210, 380/287, 54; 713/176; 480/460; 386/94; 399/366; 283/902; 726/26, 31
See application file for complete search history.

(56) References Cited

U.S. PATENT DOCUMENTS

| 7,742,181 | B2 | 6/2010 | Nakano |
| 7,907,862 | B2 | 3/2011 | Nakano |
| 7,969,615 | B2* | 6/2011 | Itagaki ........................... 358/2.1 |
| 2009/0284782 | A1* | 11/2009 | Murakami ................... 358/1.14 |

FOREIGN PATENT DOCUMENTS

JP    2001197297    7/2001

* cited by examiner

*Primary Examiner* — Barbara Reinier
(74) *Attorney, Agent, or Firm* — Fitzpatrick, Cella, Harper & Scinto

(57) ABSTRACT

By addition of a copy forgery inhibited pattern image having a lower density to an image in a saving mode, there is provided an image processing apparatus which can reduce consumption amounts of toner and ink while keeping effectiveness of the copy forgery inhibited pattern image. The present invention is an image processing apparatus having a copy forgery inhibited pattern image addition mode and a saving mode, and includes a unit configured to determine whether the copy forgery inhibited pattern image addition mode is set and a unit configured to determine whether the saving mode is set, wherein a density of the copy forgery inhibited pattern image to be added to the image in the case where the saving mode is set is lower than a density of the copy forgery inhibited pattern image to be added to the image in the case where the saving mode isn't set.

7 Claims, 22 Drawing Sheets

COPY FORGERY INHIBITED
PATTERN IMAGE
INFORMATION 306

INPUT BACKGROUND IMAGE 401

COLOR INFORMATION 402

PROCESSING REGION INFORMATION 403

LATENT IMAGE PATTERN 404

LATENT-IMAGE BACKGROUND REGION
DESIGNATION IMAGE 405

BACKGROUND PATTERN 406

FIG.4

| 5 | 17 | 41 | 63 | 59 | 35 | 11 | 3 |
|---|---|---|---|---|---|---|---|
| 15 | 29 | 55 | 46 | 44 | 51 | 27 | 13 |
| 39 | 48 | 24 | 22 | 20 | 30 | 53 | 37 |
| 56 | 32 | 8 | 0 | 6 | 18 | 42 | 61 |
| 58 | 34 | 10 | 2 | 4 | 16 | 40 | 62 |
| 45 | 50 | 26 | 12 | 14 | 28 | 54 | 47 |
| 21 | 31 | 52 | 36 | 38 | 49 | 25 | 23 |
| 7 | 19 | 43 | 60 | 57 | 33 | 9 | 1 |

FIG.6

| 0 | 32 | 8 | 40 | 2 | 34 | 10 | 42 |
|---|---|---|---|---|---|---|---|
| 48 | 24 | 56 | 16 | 50 | 26 | 58 | 18 |
| 12 | 44 | 4 | 36 | 14 | 46 | 6 | 38 |
| 60 | 20 | 52 | 28 | 62 | 22 | 54 | 30 |
| 3 | 35 | 11 | 43 | 1 | 33 | 9 | 41 |
| 51 | 27 | 59 | 19 | 49 | 25 | 57 | 17 |
| 15 | 47 | 7 | 39 | 13 | 45 | 5 | 37 |
| 63 | 23 | 55 | 31 | 61 | 21 | 53 | 29 |

FIG.8

| 2 | 6 | 18 | 40 | 68 | 99 | 119 | 127 | 127 | 116 | 95 | 65 | 37 | 23 | 11 | 1 |
|---|---|---|---|---|---|---|---|---|---|---|---|---|---|---|---|
| 5 | 13 | 26 | 48 | 76 | 106 | 126 | 122 | 121 | 124 | 111 | 73 | 45 | 31 | 12 | 4 |
| 17 | 25 | 33 | 56 | 84 | 114 | 109 | 102 | 101 | 106 | 112 | 81 | 53 | 32 | 24 | 16 |
| 39 | 47 | 55 | 62 | 93 | 89 | 79 | 71 | 70 | 78 | 86 | 91 | 61 | 54 | 46 | 38 |
| 67 | 75 | 83 | 90 | 60 | 59 | 51 | 43 | 42 | 50 | 58 | 63 | 92 | 82 | 74 | 66 |
| 98 | 105 | 110 | 80 | 52 | 35 | 29 | 21 | 20 | 28 | 34 | 57 | 85 | 113 | 104 | 96 |
| 118 | 123 | 103 | 72 | 44 | 30 | 15 | 9 | 8 | 14 | 27 | 49 | 77 | 107 | 125 | 117 |
| 127 | 115 | 94 | 64 | 36 | 22 | 10 | 0 | 3 | 7 | 19 | 41 | 69 | 100 | 120 | 127 |
| 127 | 116 | 95 | 65 | 37 | 23 | 11 | 1 | 2 | 6 | 18 | 40 | 68 | 99 | 119 | 127 |
| 121 | 124 | 111 | 73 | 45 | 31 | 12 | 4 | 5 | 13 | 26 | 48 | 76 | 106 | 126 | 122 |
| 101 | 108 | 112 | 81 | 53 | 32 | 24 | 16 | 17 | 25 | 33 | 56 | 84 | 114 | 109 | 102 |
| 70 | 78 | 86 | 91 | 61 | 54 | 46 | 38 | 39 | 47 | 55 | 62 | 93 | 89 | 79 | 71 |
| 42 | 50 | 58 | 63 | 92 | 82 | 74 | 66 | 67 | 75 | 83 | 90 | 60 | 59 | 51 | 43 |
| 20 | 28 | 34 | 57 | 85 | 113 | 104 | 96 | 98 | 105 | 110 | 80 | 52 | 35 | 29 | 21 |
| 8 | 14 | 27 | 49 | 77 | 107 | 125 | 117 | 118 | 123 | 103 | 72 | 44 | 30 | 15 | 9 |
| 3 | 7 | 19 | 41 | 69 | 100 | 120 | 127 | 127 | 115 | 94 | 64 | 36 | 22 | 10 | 0 |

FIG.20

IMAGE PROCESSING APPARATUS FOR PRINTING A COPY FORGERY INHIBITED PATTERN USING DIFFERENT VALUES WHEN IN A COLOR SAVING MODE

BACKGROUND OF THE INVENTION

1. Field of the Invention

The present invention relates to image processing apparatuses, image processing methods, and programs. Specifically, the present invention relates to an image processing apparatus, an image processing method, and a program which combine a copy forgery inhibited pattern image with the background of an image and output the combined image, for the purpose of suppressing unjust counterfeiting and information leakage of an important document by its image duplication.

2. Description of the Related Art

In some of receipts, securities, and certifications, a special pattern is printed in the background so as to cause a character or an image to stand out, in order to prevent the duplication from being easily performed. This special pattern is generally called a "copy forgery inhibited pattern image". By adding the copy forgery inhibited pattern image to the background, there is provided a mechanism to enable an original document not to be duplicated easily even by the duplication, and thus an effect of suppressing the duplication of the original document is realized although it is at a psychological level.

A region where a dot remains after duplication (referred to as a "latent image part" in the present specification) is configured with block dots in which respective dots are concentrated, and a region where the dot disappears after the duplication (referred to as a "background part" in the present specification) is configured with dots in which the respective dots are dispersed. Thereby, it is possible to create two regions having characteristics different from each other while having approximately the same dot density.

In the case where the copy forgery inhibited pattern image is required to be used, although a dedicated sheet preprinted by a sheet maker may be used, there is realized a technique of creating the copy forgery inhibited pattern image in a software manner and outputting a document in which the copy forgery inhibited pattern image is arranged in the background, through the use of a printing device (refer to Japanese Patent Laid-Open No. 2001-197297).

Meanwhile, in the field related to the present invention, there is known a method of reducing running cost of a printing device to reduce expenses, by using a function of making image density lower and reducing consumption amounts of toner, ink, and the like (saving mode).

Here, in the case of performing printing in the saving mode on an image to which a copy forgery inhibited pattern image is added, not only the density of the image but also the density of the copy forgery inhibited pattern image becomes low and thus the latent image part does not stand out and it becomes unable to obtain the effect of the copy forgery inhibited pattern image.

Therefore, in the prior art, exclusion processing is carried out to enable the copy forgery inhibited pattern image not to be printed in the saving mode. In this exclusion processing, the saving mode becomes invalid at the time of the setting of the copy forgery inhibited pattern image addition.

Alternatively, in the prior art, the saving function of the toner and ink in the saving mode is applied only to the image, and the printing of the copy forgery inhibited pattern image always at the same density prevents the effect of the copy forgery inhibited pattern image from being lowered.

However, in the exclusion processing in which the copy forgery inhibited pattern image addition and the saving mode cannot be set at the same time as described above, in the case of placing priority on the copy forgery inhibited pattern image addition and making the saving mode invalid at the time of setting of the copy forgery inhibited pattern image addition, it is not possible to suppress the toner consumption amount. Accordingly, there has been a problem in which it is not possible to reduce the running cost of the printing device.

Furthermore, in the case of placing priority on the saving mode and enabling the copy forgery inhibited pattern image not to be added at the time of the setting of the saving mode, it becomes unable to realize the effect of suppressing the duplication on all the printed matters regardless of the contents thereof, and thus there has been a problem related to security.

Alternatively, in the case of performing the printing in the setting of the saving mode by making density lower only for the image and keeping the same density for the copy forgery inhibited pattern image, the density of the copy forgery inhibited pattern image is not changed while the density of the image becomes lower. Accordingly, density difference becomes small between the image and the copy forgery inhibited pattern image which is the background of the image, and visibility of the image is lowered considerably. Moreover, since the density of the copy forgery inhibited pattern image is the same, there has been a problem in which the effect of the saving mode is also lowered.

SUMMARY OF THE INVENTION

The present invention provides an image processing apparatus having a copy forgery inhibited pattern image addition mode which prints an image by adding a copy forgery inhibited pattern image thereto and a saving mode which prints the image having a lower density than a normal mode, and the image processing apparatus includes a unit configured to determine whether or not the copy forgery inhibited pattern image addition mode is set, and a unit configured to determine whether or not the saving mode is set, wherein the density of the copy forgery inhibited pattern image to be added to the image in the case where the saving mode is determined to be set is lower than the density of the copy forgery inhibited pattern image to be added to the image in the case where the saving mode is determined not to be set.

The present invention has been made in view of the above-described problems. According to the present invention, by adding the copy forgery inhibited pattern image having a lower density to the image in the saving mode, it is possible to reduce consumption amounts of toner, ink and the like, while keeping the effectiveness of the copy forgery inhibited pattern image which suppresses the duplication. Therefore, it becomes possible to reduce the running cost of the printing device.

Furthermore, by adding of the copy forgery inhibited pattern image having a lower density, it becomes possible to keep a density difference between the copy forgery inhibited pattern image in the saving mode and the image in the saving mode and to suppress the lowering of the visibility of the image.

Further features of the present invention will become apparent from the following description of exemplary embodiments (with reference to the attached drawings).

BRIEF DESCRIPTION OF THE DRAWINGS

FIG. 4 is a diagram showing contents of copy forgery inhibited pattern image information 306 according to Embodiment 1 of the present invention;

FIG. 6 is a diagram showing an example an 8×8 dot concentration-type dither matrix according to Embodiment 1 of the present invention;

FIG. 8 is a diagram showing an example of an 8×8 dot distribution type dither matrix according to Embodiment 1 of the present invention;

FIG. 20 is a diagram showing an example of a dot concentration-type dither matrix for a saving mode according to Embodiment 3 of the present invention;

DESCRIPTION OF THE EMBODIMENTS

Figure 1:
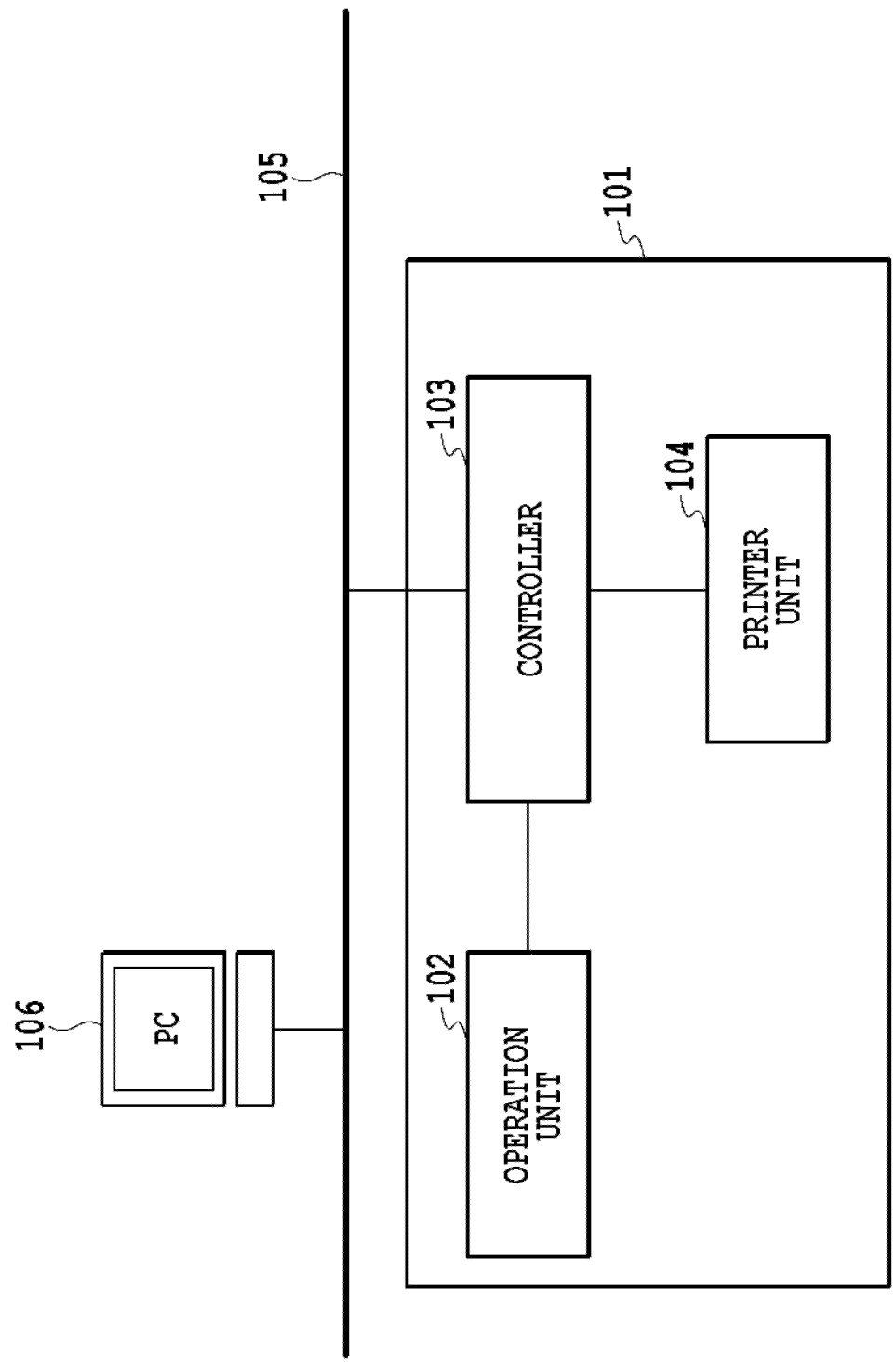
FIG. 1 is a block diagram showing a configuration of an image processing system according to Embodiment 1 of the present invention.

Hereinafter, embodiments of the present invention will be explained with reference to the drawings. Meanwhile, it is to be noted that the same reference numeral indicates the same element unless otherwise clearly indicated in particular.

Embodiment 1

System Configuration of an Image Processing System

A first embodiment (Embodiment 1) of the present invention will be explained. FIG. 1 is a block diagram showing a configuration of an image processing system according to Embodiment 1 of the present invention. As shown in FIG. 1, the image processing system is configured with an image processing apparatus 101 and a host computer 106.

While, in the example shown in FIG. 1, one image processing apparatus 101 and one host computer 106 are connected to a network 105, the number of connections is not limiting in the image processing system of the present invention. Furthermore, while the network 105 is applied as a connection method, the connection method is not limited to this case and it is also possible to apply, for example, a serial transmission method such as USB, a parallel transmission method such as Centronics or SCSI, or the like.

The host computer (hereinafter, called PC) 106 has a function of a personal computer. The PC 106 can transmit and receive a file via the network 105. Moreover, the PC 106 can transmit print date to the image processing apparatus 101 via a printer driver.

The image processing apparatus 101 is configured with an operation unit 102 provided with plural keys for user instruction, a controller 103 performing operation control of the entire image processing apparatus 101, and a printer unit 104 which is an image output device. The operation unit 102 displays various kinds of information of which a user is to be notified.

(Configuration of the Controller)

Figure 2:
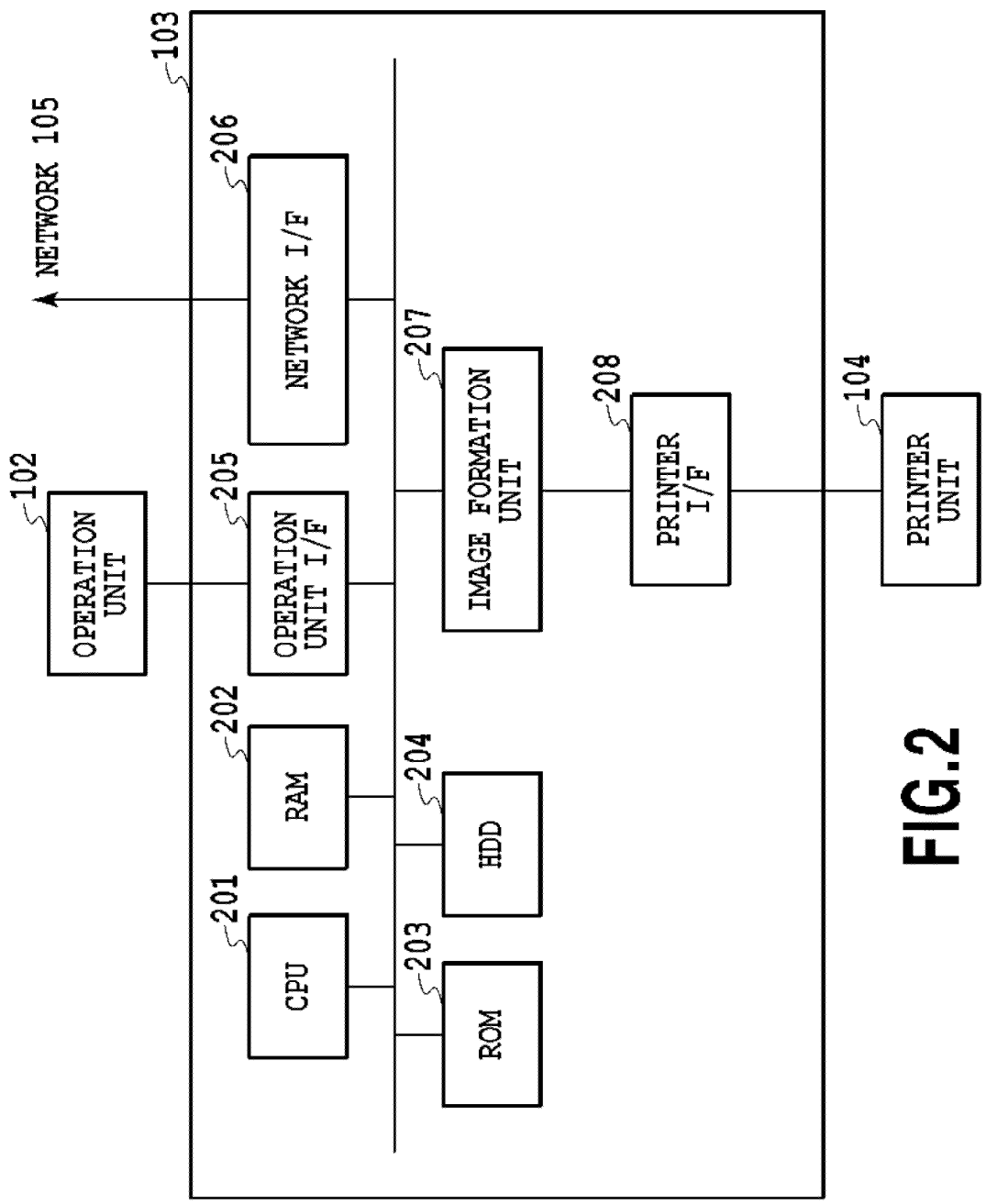
FIG. 2 is a block diagram showing a configuration of a controller 103 in an image processing apparatus 101 according to Embodiment 1 of the present invention.

FIG. 2 is a block diagram showing a configuration of the controller 103 in the image processing apparatus 101. As shown in FIG. 2, the controller 103 is configured with a CPU 201, a RAM 202, a ROM 203, an HDD 204, an operation unit I/F 205, a network I/F 206, an image formation unit 207, and a printer I/F 208.

The controller 103 is connected to the PC 106, an external image processing apparatus, and the like via the network 105. Thereby, the controller 103 can input and output print data and device information via the network 105.

The CPU 201 controls, in an integrated manner, accesses of various kinds of device under connection and also controls, in an integrated manner, various kinds of processing such as image processing performed in the controller 103, on the basis of a control program and the like stored in the ROM 203.

The RAM 202 is a system work memory for the operation of the CPU 201, and also a memory for storing image data temporarily. The RAM 202 is configured with an SRAM retaining stored contents after power-off and a DRAM erasing the stored contents after the power-off.

The ROM 203 stores a boot program and the like of the image processing apparatus.

The HDD 204 is a hard disk drive and can store system software and image data.

The operation unit I/F 205 is an interface unit for connecting the operation unit 102 to each constituent of the controller 103. The operation unit I/F 205 outputs image data to be displayed by the operation unit 102, to the operation unit 102, and also obtains information input from the operation unit 102.

The network I/F 206 is connected to the network 105. The image processing apparatus 101 performs transmission and reception of image date and information with the external apparatuses via the network I/F 206.

The image formation unit 207 receives intermediate data generated on the basis of PDL code data which is print data transmitted from the PC 106 or the like, and generates bit map (multi value) image data and attribute data. Moreover, the image formation unit 207 performs image processing on this generated image data while referring to the attribute data accompanying the image data. The image data after the image processing is output to the printer unit 104 via the printer I/F 208.

The printer unit 104 forms an electrostatic latent image in accordance with the image data after the image processing, and forms a single color toner image by developing the formed electrostatic latent image. Successively, the printer unit 104 forms a multicolor toner image by overlapping the single color toner images with one another, transfers the formed multicolor toner image onto a recording medium, and fixes the multicolor toner image on the recording medium.

(Configuration of the Image Formation Unit)

Figure 3:
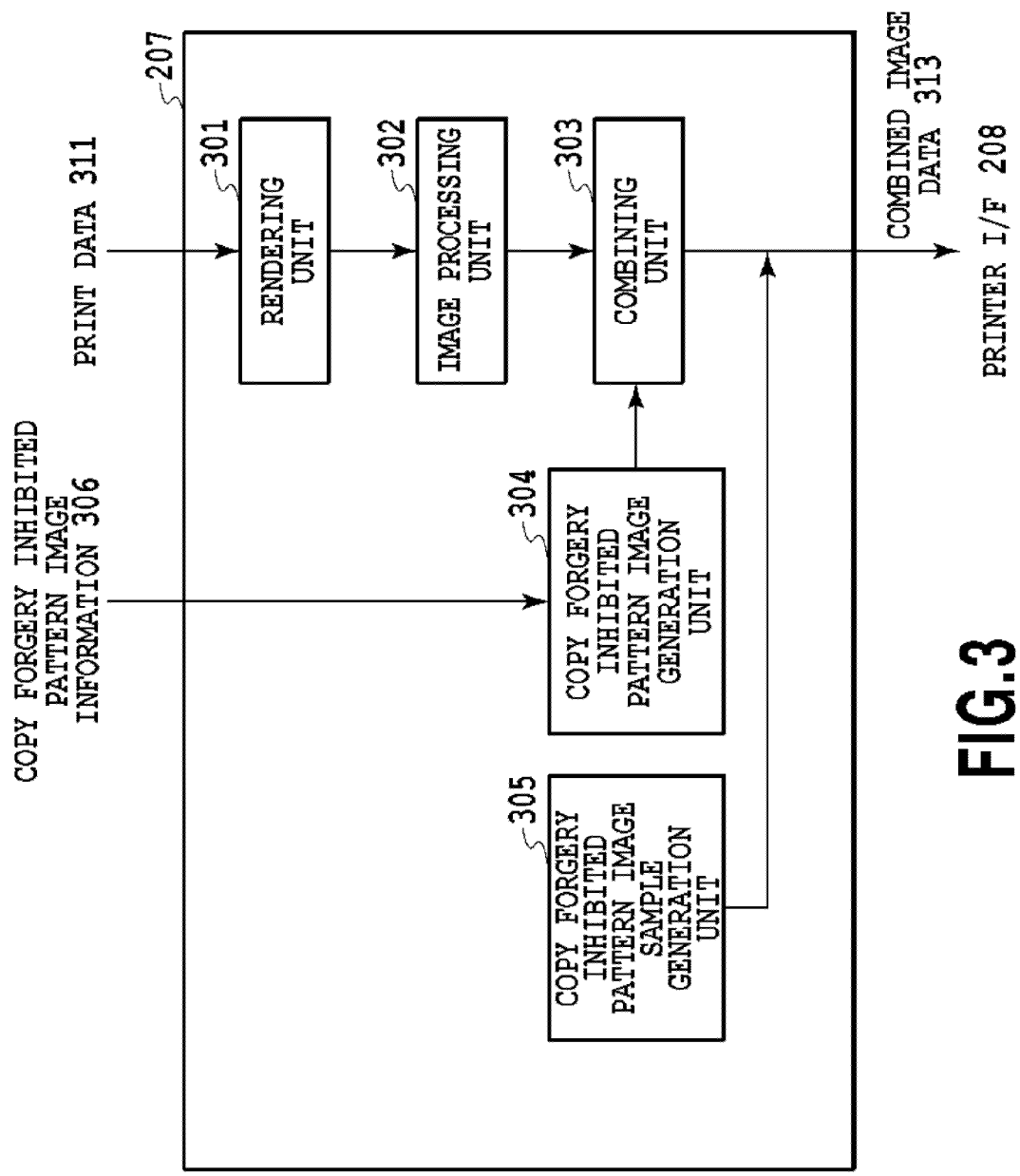
FIG. 3 is a block diagram showing a configuration of an image formation unit 207 in a controller 103 according to Embodiment 1 of the present invention.

FIG. 3 is a block diagram showing a configuration of the image formation unit 207 in the controller 103. As shown in FIG. 3, the image formation unit 207 is configured with a rendering unit 301, an image processing unit 302, a combining unit 303, a copy forgery inhibited pattern image generation unit 304, and a copy forgery inhibited pattern image sample generation unit 305.

The rendering unit 301 analyzes the print data 311 transmitted from the PC 106 or the like, and generates the image data and the attribute data. The image data is a drawing bit map in which there is formed a pixel pattern for performing drawing in accordance with the resolution of the printer unit 104 through the use of drawing information of the print data 311, and color information for performing drawing on each pixel is provided. The attribute data is an attribute bit map in which information of the print date 311 being any one of one of a character, a line, a graphic, and an image is stored so as to correspond to each pixel of the drawing bit map.

The image processing unit 302 converts the color information of the image data into the CMYK density color space including four image signals of toner colors in the printing device, by using a color conversion LUT or matrix operation. The image data, in which the color information is converted into the CMYK color space, has a value of eight bits in each of the image signals for each pixel. Successively, the image processing unit 302 performs gradation correction and converts the image data having a pixel value of eight bits into image data having a pixel value of four bits which can be printed by the printer unit 104, by performing pseudo gray scale processing using dither processing.

The copy forgery inhibited pattern image generation unit 304 generates copy forgery inhibited pattern image data which is a bit map of a copy forgery inhibited pattern image, from copy forgery inhibited pattern image information 306 including a setting value for generating the copy forgery inhibited pattern image, and outputs the generated copy forgery inhibited pattern image data to the combining unit 303. The generation of the copy forgery inhibited pattern image data will be explained later in detail (refer to FIG. 5).

The combining unit 303 generates combined image data 313 in which the copy forgery inhibited pattern image data generated in the copy forgery inhibited pattern image generation unit 304 is added to the image data generated in the image processing unit 302. Successively, the combining unit 303 sends the combined image data 313 to the printer unit 104 via the printer I/F 208.

The copy forgery inhibited pattern image sample generation unit 305 generates a copy forgery inhibited pattern image sample to be described later for matching the density in the latent image part of the copy forgery inhibited pattern image with the density in the background part of the copy forgery inhibited pattern image. Successively, the copy forgery inhibited pattern image sample generation unit 305 sends the generated copy forgery inhibited pattern image sample to the printer unit 104 via the printer I/F 208.

(Generation of the Copy Forgery Inhibited Pattern Image)

Next, the generation of the copy forgery inhibited pattern image will be explained in detail. The copy forgery inhibited pattern image is configured with the latent image part where a dot remains and the background part where a dot disappears, after duplication at the same density.

In the present embodiment, the copy forgery inhibited pattern image is generated through the use of a dithering method. The image corresponding to the background part is designed so as to cause the dots to be arranged in a dispersed manner through the use of a dot dispersion-type dither matrix. In addition, the image corresponding to the latent image part is designed so as to cause the dots to be arranged in a concentrated manner through the use of a dot concentration-type dither matrix. Moreover, in the present embodiment, there are generated binary images configuring the latent image part and the background part through the use of the dithering methods by inputting appropriate input image signals, respectively, so as to cause the latent image part and the background part to have approximately the same density as each other at the time of the printing on a sheet through the use of the printer unit 104. There will be described later in detail a generation method of the background part and the latent image part as to cause the background part and the latent image part to have approximately the same density as each other at the time of the printing on a sheet through the use of the printer unit 104.

In the following explanation, the binary image configuring the background part is called a background pattern and the binary image configuring the latent image part is called a latent image pattern.

FIG. 4 is a diagram showing contents of the copy forgery inhibited pattern image information 306. The copy forgery inhibited pattern image information 306 is configured with an input background image 401, color information 402, processing region information 403, a latent image pattern 404, a latent-image background region designation image 405, and a background pattern 406. The copy forgery inhibited pattern image information 306 is stored in a storage medium such as the HDD 204.

Figure 5:
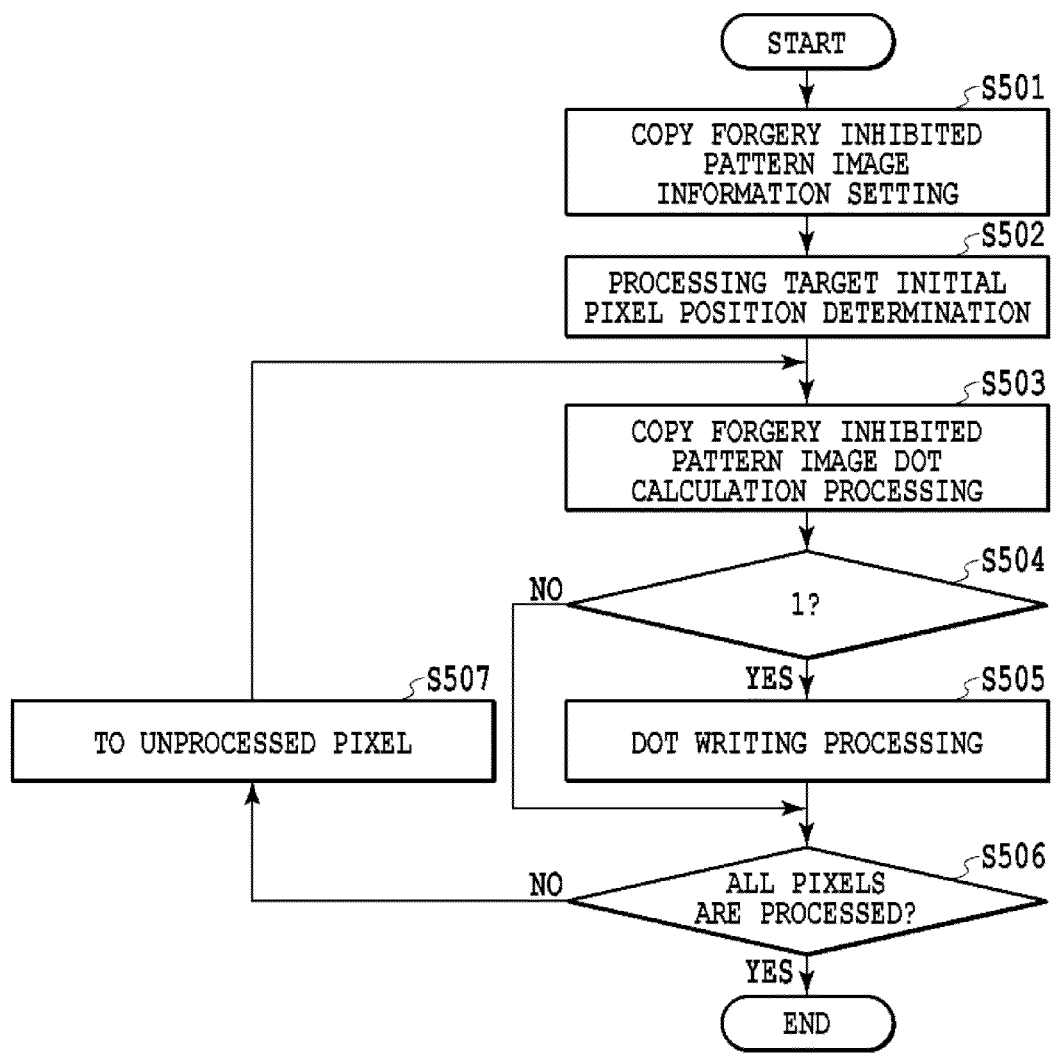
FIG. 5 is a flowchart showing a flow of copy forgery inhibited pattern image data generation in a copy forgery inhibited pattern image generation unit 304 according to Embodiment 1 of the present invention.

FIG. 5 is a flowchart showing a flow of the copy forgery inhibited pattern image data generation processing in the copy forgery inhibited pattern image generation unit 304.

First in step S501, the copy forgery inhibited pattern image generation unit 304 receives the copy forgery inhibited pattern image information 306 from the storage medium such as the HDD 204. The copy forgery inhibited pattern image information 306, as described above, includes the input background image 401, the color information 402, the background pattern 406, the latent image pattern 404, and the latent-image background region designation image 405.

Next, in step S502, the copy forgery inhibited pattern image generation unit 304 determines an initial pixel position for the generation of a copy forgery inhibited pattern image. For example, in the case of performing image processing on the whole input image from the upper left-hand part to the lower right-hand part thereof in a raster-scanning order, to thereby perform conversion into the copy forgery inhibited pattern image, the pixel position of the upper left-hand part of the input image is set as the initial image position. In this case, the background pattern 406, the latent image pattern 404, and the latent-image background region designation image 405 are disposed in a tile pattern, from the upper left-hand part of the input background image 401.

Next, in step S503, the copy forgery inhibited pattern image generation unit 304 performs dot calculation processing on a pixel of the input background image 401 to be processed. The dot calculation processing is performed for determining whether or not a pixel value corresponding to a dot in the printing is to be written. The pixel value at this time corresponds to the input color information 402. By the dot calculation, 1 is set in the case where the pixel value of the latent image pattern is black in a pixel corresponding to a latent-image part in the latent-image background region designation image, and 0 is set in the case where the pixel value of the latent pattern is white. Furthermore, by the dot calculation processing, 1 is set in the case where the pixel value of the background pattern is black, in a pixel corresponding to a background part in the latent-image background region designation image, and 0 is set in the case where this pixel value of the background pattern is white.

Next, in step S504, the copy forgery inhibited pattern image generation unit 304 determines the calculation result of step S503. Specifically, the copy forgery inhibited pattern image generation unit 304 determines whether or not the pixel value is 1. Here, in the case where the pixel value is 1, the process goes to step S505, and in the case where the pixel value is not 1 (that is, 0), the process goes to step S506.

In step S505, the copy forgery inhibited pattern image generation unit 304 performs processing of writing the pixel value corresponding to the dot at the time of printing. The pixel value can be changed in accordance with a color designated in the color information 402. In the case where a black copy forgery inhibited pattern image is required to be created, the color of a pixel to be processed in the input background image 401 is set to be black. In addition to black, by setting the color of the pixel to be processed to cyan, magenta, or yellow in accordance with the color of toner or ink in the printer, it is possible to create the copy forgery inhibited pattern image having each of the colors.

In step S506, the copy forgery inhibited pattern image generation unit 304 determines whether or not all the pixels have been processed in a processing target region of the input background image 401. In the case where all the pixels have not been processed in the processing target region of the input background image 401, the process goes to step S507, and selects an unprocessed pixel and carries out the processing in step S503 to step S505 again. In the case where the processing has been completed for all the pixels in the processing target region of the input background image 401, the copy forgery inhibited pattern image generation unit 304 finishes the copy forgery inhibited pattern image data generation processing. By the above-mentioned processing, it is possible to generate the copy forgery inhibited pattern image data in which the image processing is performed on the input background image 401.

(Dot Arrangement Method)

Next, a dot arrangement method in the latent image part and the background image part will be explained. Here, the explanation will be made in the case where the latent image part is generated on the basis of the dot concentration-type dither matrix and the background part is generated on the basis of the dot dispersion-type dither matrix.

FIG. 6 is a diagram showing an example of an 8×8 dot concentration-type dither matrix. The threshold pattern is designed so as to cause the dots to be concentrated at the center and the four corners.

Figure 7:
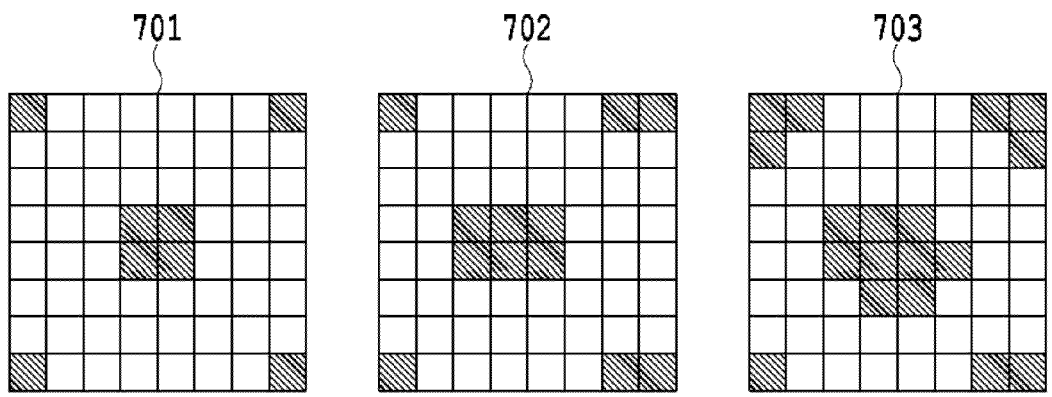
FIG. 7 is a diagram showing a threshold pattern (dot arrangement) obtained through the use of a dot concentration-type dither matrix according to Embodiment 1 of the present invention.

FIG. 7 is a diagram showing a threshold pattern (dot arrangement) obtained by performing threshold processing on a predetermined input image signal through the use of the 8×8 dot concentration-type dither matrix of FIG. 6. In FIG. 7, the patterns 701, 702, and 703 show the threshold patterns obtained by performing the threshold processing on the input image signals of 8, 12, and 18, respectively, using the dither matrix of FIG. 6. As shown in FIG. 7, the threshold pattern (dot arrangement) obtained through the use of the dot concentration-type dither matrix is a pattern in which the dots are arranged in a concentrated manner.

FIG. 8 is a diagram showing an example of an 8×8 dot dispersion-type dither matrix. The threshold pattern is designed so as to cause the dots to be arranged in a dispersed manner.

Figure 9:
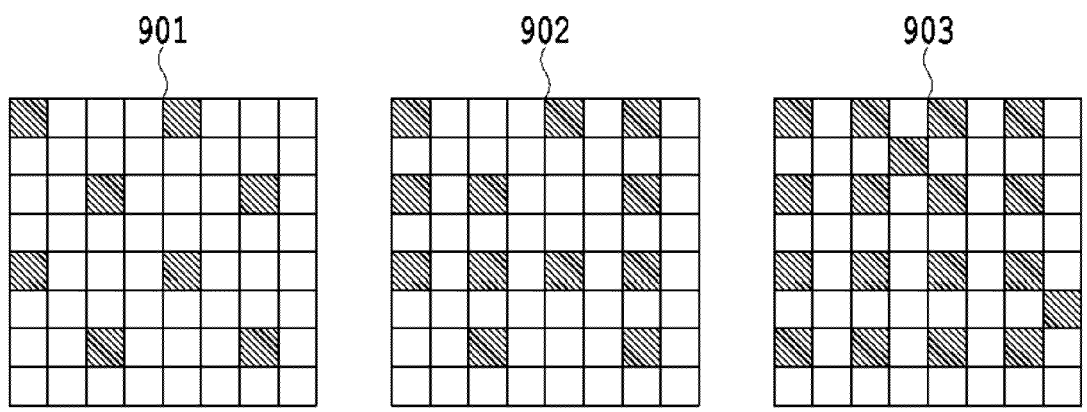
FIG. 9 is a diagram showing a threshold pattern (dot arrangement) obtained through the use of a dot distribution type dither matrix according to Embodiment 1 of the present invention.

FIG. 9 is a diagram showing a threshold pattern (dot arrangement) obtained by performing the threshold processing on the predetermined input image signal through the use of the 8×8 dot dispersion-type dither matrix of FIG. 8. In FIG. 9, the patterns 901, 902, and 903 show the threshold patterns obtained by performing the threshold processing on the input image signals of 8, 12, and 18, respectively, through the use of the dither matrix of FIG. 8. As shown in FIG. 9, the threshold pattern (dot arrangement) obtained through the use of the dot dispersion-type dither matrix is a pattern in which the dots are arranged separated from one another in a dispersed manner.

Figure 10A:
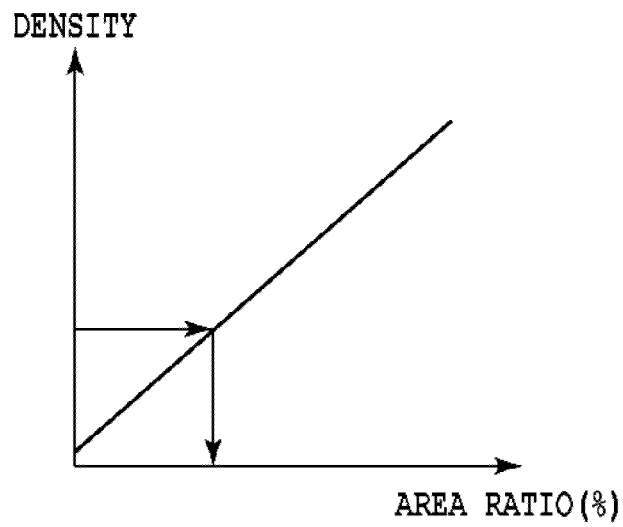
FIGS. 10A to 10C are graphs showing a relationship between an area ratio of a threshold pattern and density according to Embodiment 1 of the present invention.
Figure 10B:
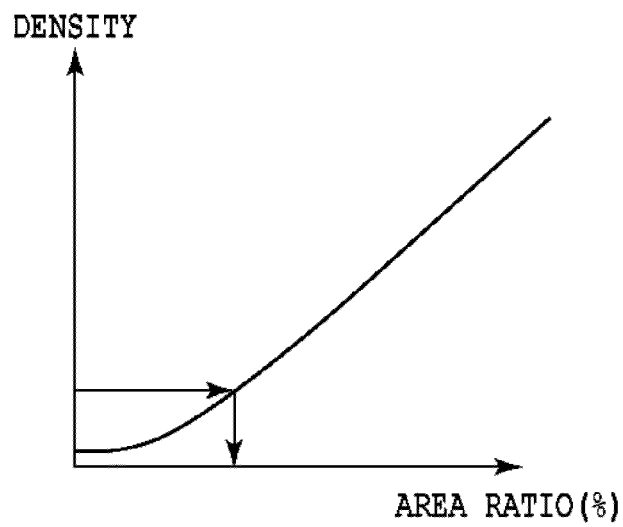
Figure 10C:
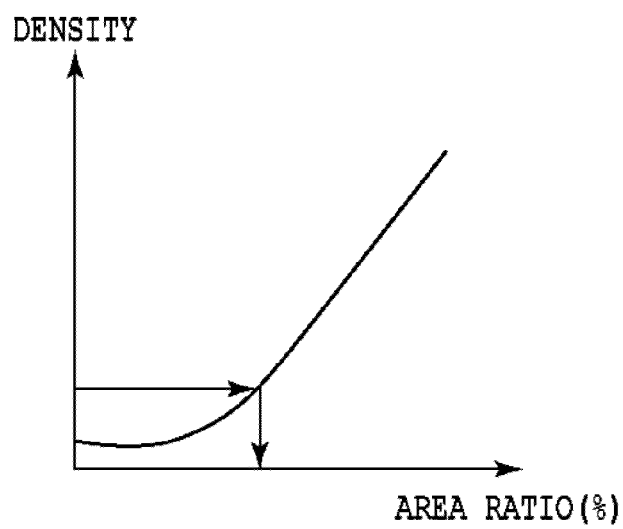

FIGS. 10A, 10B, and 10C are graphs each showing a relationship between an area ratio of the threshold pattern and density. In each of the graphs in FIGS. 10A to 10C, the horizontal axis shows an area ratio of the black pixels in the threshold pattern obtained by performing the threshold processing on the input image signal through the use of the dither matrix, and the vertical axis shows density of the threshold pattern in the printing. Here, in the dither processing, the area ratio of the black pixels changes in accordance with the gradation of the input image signal, and thus the horizontal axis in each of the graphs in FIGS. 10A to 10C may be considered as a gradation level of the input image signal.

There will be examined a case where the density characteristics of the gradation level of the dither matrix used for the generation of the background part and the density characteristics of the gradation level of the dither matrix used for the generation of the latent image part are density characteristics as shown in FIG. 10A, for example, and are the same as each other. In this case, in the case where the horizontal axis value (area ratio of the black pixels) obtained by the dither matrix used for the generation of the background part and the horizontal axis value obtained by the dither matrix used for the generation of the latent image part are approximately the same as each other, the density of the background threshold pattern and the density of the latent image threshold pattern becomes approximately the same as each other. Accordingly, it is possible to generate the copy forgery inhibited pattern image in which the latent image is not conspicuous.

Actually, however, depending on a characteristics of the printer, the density characteristics of the gradation level of the dither matrix used for the generation of the background part and the density characteristics of the gradation level of the dither matrix used for the generation of the latent image part are not always the same as each other. For example, the density characteristics of the dot concentration-type dither matrix as used for the generation of the latent image part are characteristics in which the density becomes higher gradually to the gradation level as shown in FIG. 10B. In contrast, the density characteristics of the dot dispersion-type dither matrix as used for the generation of the background part are characteristics in which the density becomes higher slowly first and rapidly from the middle, as shown in FIG. 10C, compared with the density characteristics of the dot concentration-type dither matrix. In such a case, even in the case where the area ratio of the black pixels in the background pattern and the area ratio of the black pixels in the latent image pattern are set to be approximately the same as each other, the density of the background part and the density of the latent image part does not become the same as each other at the time of the printing. Accordingly, it is not possible to generate the copy forgery inhibited pattern image in which the latent image is not conspicuous.

By appropriately adjusting the gradation level of the input image signal for either one or both of the dither matrixes used for the background part and the latent image part, it is possible to cause the density of the background part in the printing and the density of the latent image part in the printing to become close to each other. Note that, in the case where the copy forgery inhibited pattern image is added to the image in the printer and output, for dealing with a problem that output density is shifted because of density instability of the printer, a copy forgery inhibited pattern image density adjustment function becomes necessary for performing adjustment of the copy forgery inhibited pattern image density. This will be described below in detail (refer to FIG. 13).

Figure 11:
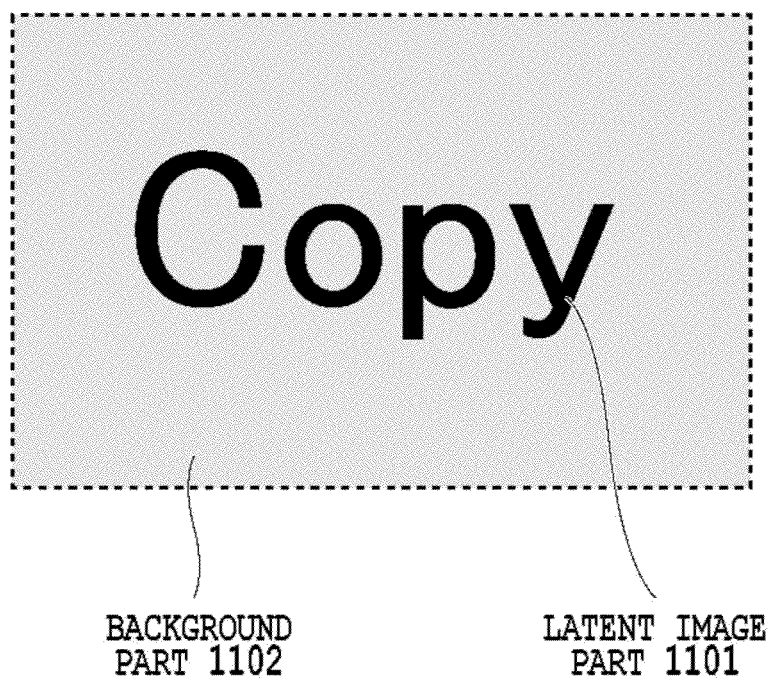
FIG. 11 is a schematic diagram showing copy forgery inhibited pattern image data generated in a copy forgery inhibited pattern image generation unit 304 according to Embodiment 1 of the present invention.

FIG. 11 is a schematic diagram showing a copy forgery inhibited pattern image data generated in the copy forgery inhibited pattern image generation unit 304 of FIG. 3. In FIG. 11, a character ("Copy" in the example shown in FIG. 11) is drawn as the latent image part 1101 with the latent image pattern shown in FIG. 7 (i.e., dot arrangement obtained through the use of the dot concentration-type dither matrix). Further, a part except the character surrounded by the broken line of FIG. 11 is drawn as the background part 1102 with the background pattern shown in FIG. 9. Here, it is to be noted that actually the latent image part 1101 and the background part 1102 in FIG. 11 have the same density and the character appears without being distinguished, and the broken line surrounding the image indicates a boundary of the image and does not exist in the actual image.

(Combining of the Copy Forgery Inhibited Pattern Image Date and the Image Data)

Next there will be explained processing in the combining unit 303 for combining the copy forgery inhibited pattern image data generated in the copy forgery inhibited pattern image generation unit 304 and the image data generated in the image processing unit 302.

Figure 12:
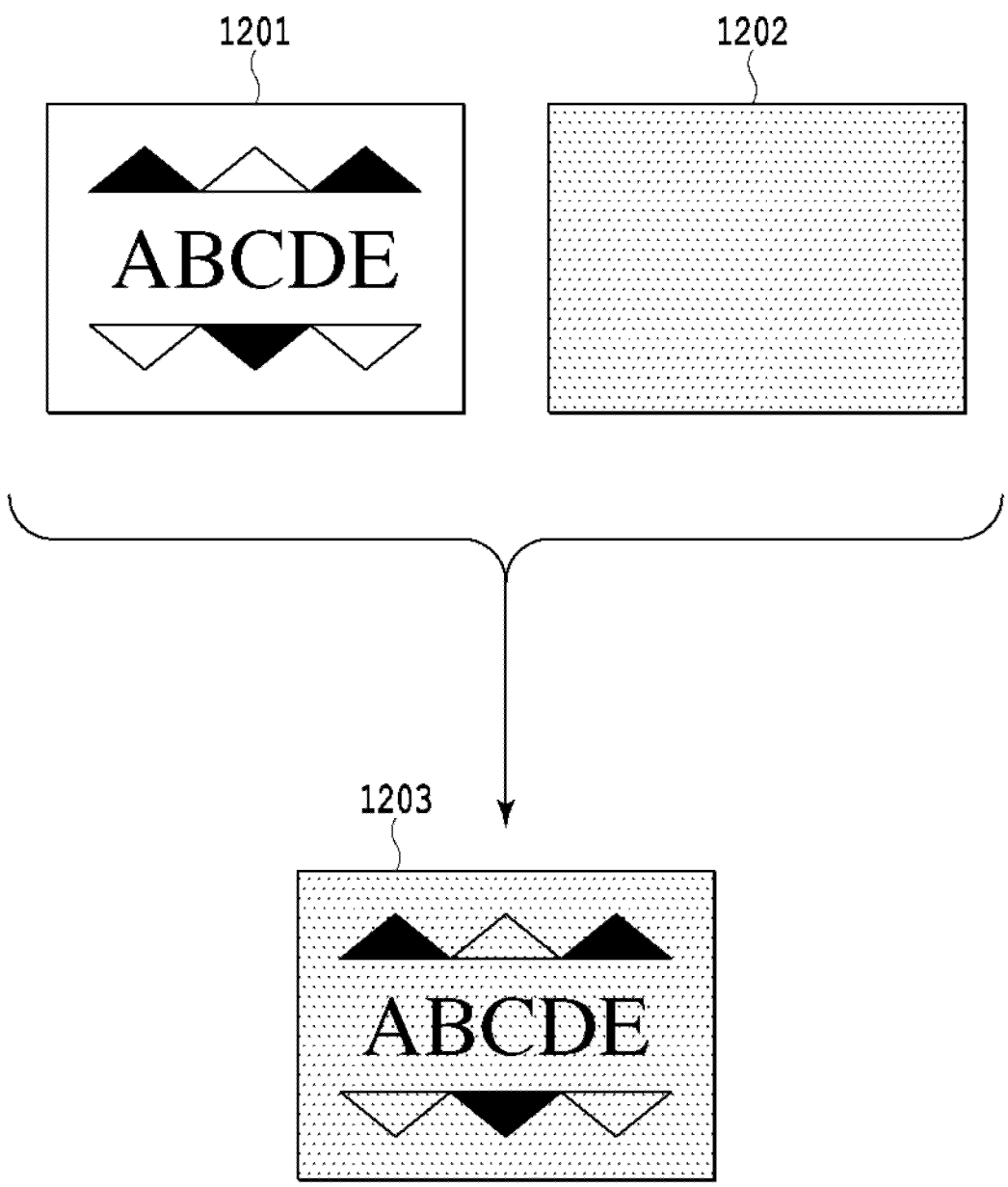
FIG. 12 is a schematic diagram showing combining processing of image data with copy forgery inhibited pattern image data according to Embodiment 1 of the present invention.

FIG. 12 is a schematic diagram showing the combining processing of the image data 1201 and the copy forgery inhibited pattern image data 1202.

The combining unit 303 generates combined image data 1203 by overlapping the copy forgery inhibited pattern image data 1202 with the image date 1201 in a software manner in accordance with a priority order (layer structure) related to displacement of the image data 1201 and the copy forgery inhibited pattern image data 1202. In the example shown in FIG. 12, the copy forgery inhibited pattern image data 1202 is overlapped as a lower layer than the image data 1201. At this time, the image data is drawn preferentially at a position where the copy forgery inhibited pattern image data and the image data overlap with each other. In this manner, the copy forgery inhibited pattern image data is disposed appropriately in the background of the image data, and thus the ground data does not lower the visibility of the image data. The combining unit 303 sends the image data with which the copy forgery inhibited pattern image data is combined, to the printer unit 104 via the printer I/F 208. The printer unit 104 prints and outputs the image to which the copy forgery inhibited pattern image is added in accordance with information of the image data with which the copy forgery inhibited pattern image data is combined.

(Copy Forgery Inhibited Pattern Image Density Adjustment Function)

In the above, the generation method of the copy forgery inhibited pattern image data and the combining method of the copy forgery inhibited pattern image data and the image data have been explained in detail. However, in the case of actually printing and outputting the image data to which the copy forgery inhibited pattern image is added using the printer, sometimes the latent image part and the background part are not always output with intended densities because of various causes. These causes can include density instability caused by a difference in engine characteristics of each printer model. Furthermore, the other causes can include density instability caused by a difference in a dither matrix outputting the copy forgery inhibited pattern image, an inter-individual difference in the printer, a difference in printing environments such as humidity and temperature, a difference in engine durability, a difference in a sheet (medium), or a difference in ink or toner, and the like. That is, the most appropriate input gradations for the respective dither matrix used for the generation of the background part and dither matrix used for the generation of the latent image part might be different from each other depending on the kind of printer model, the dither matrix, the individuality of the printer, the printing environment, the sheet, the ink or toner, and the like.

Accordingly, also in the case where the kind of printer model (that is, engine characteristics), the printing environment or the like is different, it is necessary to generate the copy forgery inhibited pattern image after having obtained such a background pattern and a latent image pattern, in which the density of the background part and the density of the latent image part become approximately the same as each other at the time of the printing. However, in reality, it is difficult to automatically calculate the most appropriate background pattern and latent image pattern, in consideration of all the fluctuation factors including the fluctuation in the printing environment.

Accordingly, before generating the copy forgery inhibited pattern image data in the copy forgery inhibited pattern image generation unit 304, it is necessary to install a function to obtain a background pattern and a latent image pattern in which the density of the background part and the density of the latent image part become approximately the same as each other (called "copy forgery inhibited pattern image density adjustment function" in the present specification), in each printer.

As an installing method of the copy forgery inhibited pattern image density adjustment function, there can be considered a method of changing the gradation of the input image signal for either one or both of the dither matrix used for the generation of the background part and the dither matrix used for the generation of the latent image part. By this method, the density of the background part at the time of the printing and the density of the latent image part at the time of the printing are adjusted so as to become approximately the same as each other.

(Copy Forgery Inhibited Pattern Image Density Adjustment Function—Generation of a Copy Forgery Inhibited Pattern Image Sample)

Next, there will be explained copy forgery inhibited pattern image sample print for realizing the copy forgery inhibited pattern image density adjustment function.

Figure 13:
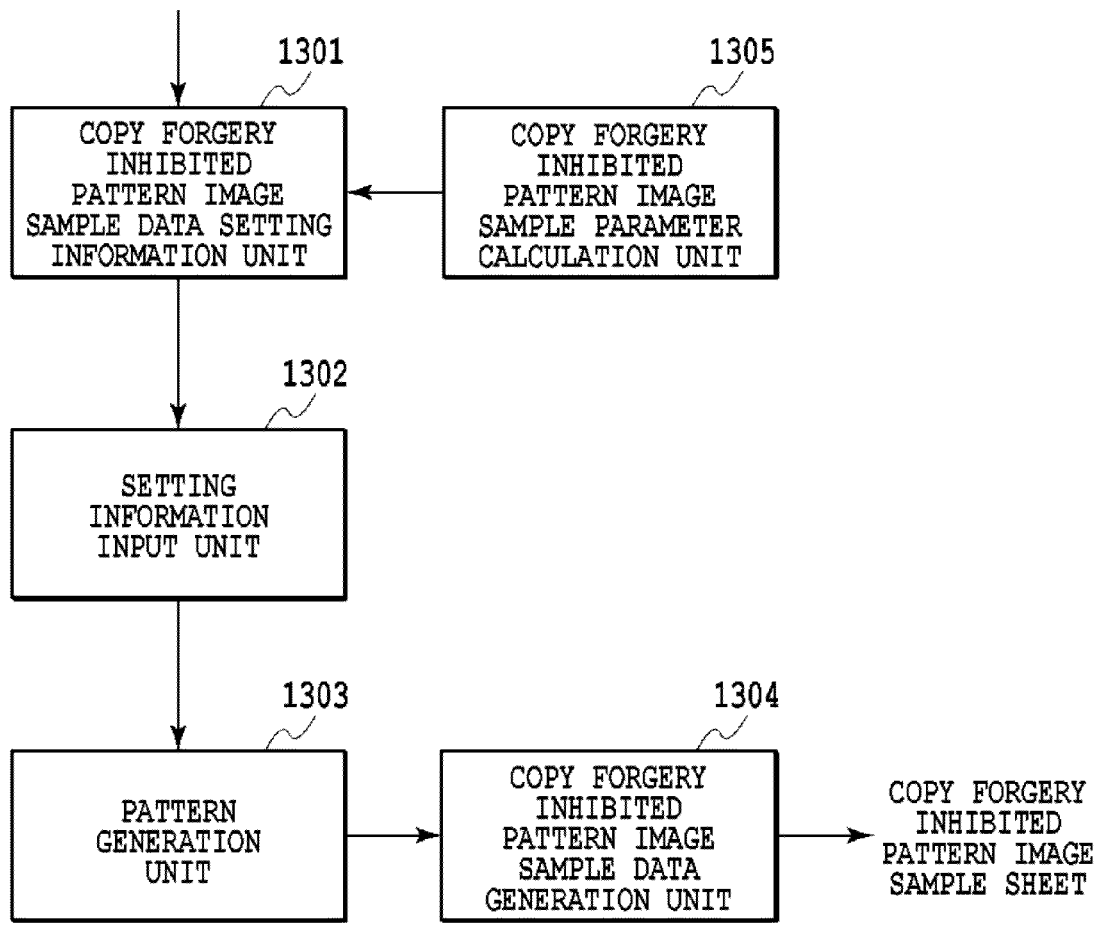
FIG. 13 is a block diagram showing a configuration of a copy forgery inhibited pattern image sample generation unit 305 according to Embodiment 1 of the present invention.

FIG. 13 is a block diagram showing a configuration of the copy forgery inhibited pattern image sample generation unit 305 generating the copy forgery inhibited pattern image sample. As shown in FIG. 13, the copy forgery inhibited pattern image sample generation unit 305 is configured with a copy forgery inhibited pattern image sample data setting information unit 1301, a setting information input unit 1302, a pattern generation unit 1303, a copy forgery inhibited pattern image sample data generation unit 1304, and a copy forgery inhibited pattern image sample parameter calculation unit 1305.

The copy forgery inhibited pattern image sample data setting information unit 1301 stores copy forgery inhibited pattern image sample data setting information such as a latent image pattern gradation level, a background pattern gradation level, a latent image pattern step level, and a background pattern step level, which are calculated in the copy forgery inhibited pattern image sample parameter calculation unit 1305. Meanwhile, in the present specification, "copy forgery inhibited pattern image sample data setting information" is also called "copy forgery inhibited pattern image sample parameter" or "setting information". While a sample sheet is generated through the use of the copy forgery inhibited pattern image sample data setting information calculated in the copy forgery inhibited pattern image sample parameter calculation unit 1305, this will be described later in detail (refer to FIG. 14).

The setting information input unit 1302 receives the setting information from the copy forgery inhibited pattern image sample data setting information unit 1301 and outputs the setting information to the pattern generation unit 1303.

The pattern generation unit 1303 generates a pattern necessary for generating the copy forgery inhibited pattern image on the basis of the setting information input from the setting information input unit 1302 and outputs the pattern to the copy forgery inhibited pattern image sample data generation unit 1304 of the succeeding stage. In the present embodiment, the pattern generated from the input setting information is configured with the background pattern and the latent image pattern. Furthermore, in copy forgery inhibited pattern image sample print processing to be described later, the pattern generation unit 1303 generates the plural background patterns and the plural latent image patterns.

The copy forgery inhibited pattern image sample data generation unit 1304 generates the copy forgery inhibited pattern image sample data on the basis of the pattern input from the pattern generation unit 1303. Details of the copy forgery inhibited pattern image sample data generated in the copy forgery inhibited pattern image sample data generation unit 1304 will be described later. The copy forgery inhibited pattern image sample data generation unit 1304 sends the copy forgery inhibited pattern image sample data generated in the copy forgery inhibited pattern image sample data generation unit 1304 to the printer unit 104, via the printer I/F 208.

(Copy Forgery Inhibited Pattern Image Density Adjustment Function—Copy Forgery Inhibited Pattern Image Sample Generation—Copy Forgery Inhibited Pattern Image Sample Sheet)

Next, there will be explained a copy forgery inhibited pattern image sample sheet, for the copy forgery inhibited pattern image density adjustment, in which there are arranged two-dimensionally plural copy forgery inhibited pattern image patches generated in the copy forgery inhibited pattern image sample data generation unit 1304 and configured with the latent image part and the background part. The density of each of the latent image parts among the copy forgery inhibited pattern image patches is fixed and the density of each of the background parts among the copy forgery inhibited pattern image patches is changed, and a portion ranging from the background part having a low density to the background part having a high density is printed on the copy forgery inhibited pattern image sample sheet. Accordingly, in one copy forgery inhibited pattern image sample sheet, a patch exists in which the density of the background part and the density of the latent image part are the same or approximately the same as each other. The latent image pattern and the background pattern, configuring the patch in which the density of the latent image part and the density of the background part are the same or approximately the same as each other are set as the latent image pattern and the background pattern to be included by the copy forgery inhibited pattern image information 306 at the time of the generation of the copy forgery inhibited pattern image.

Figure 14:
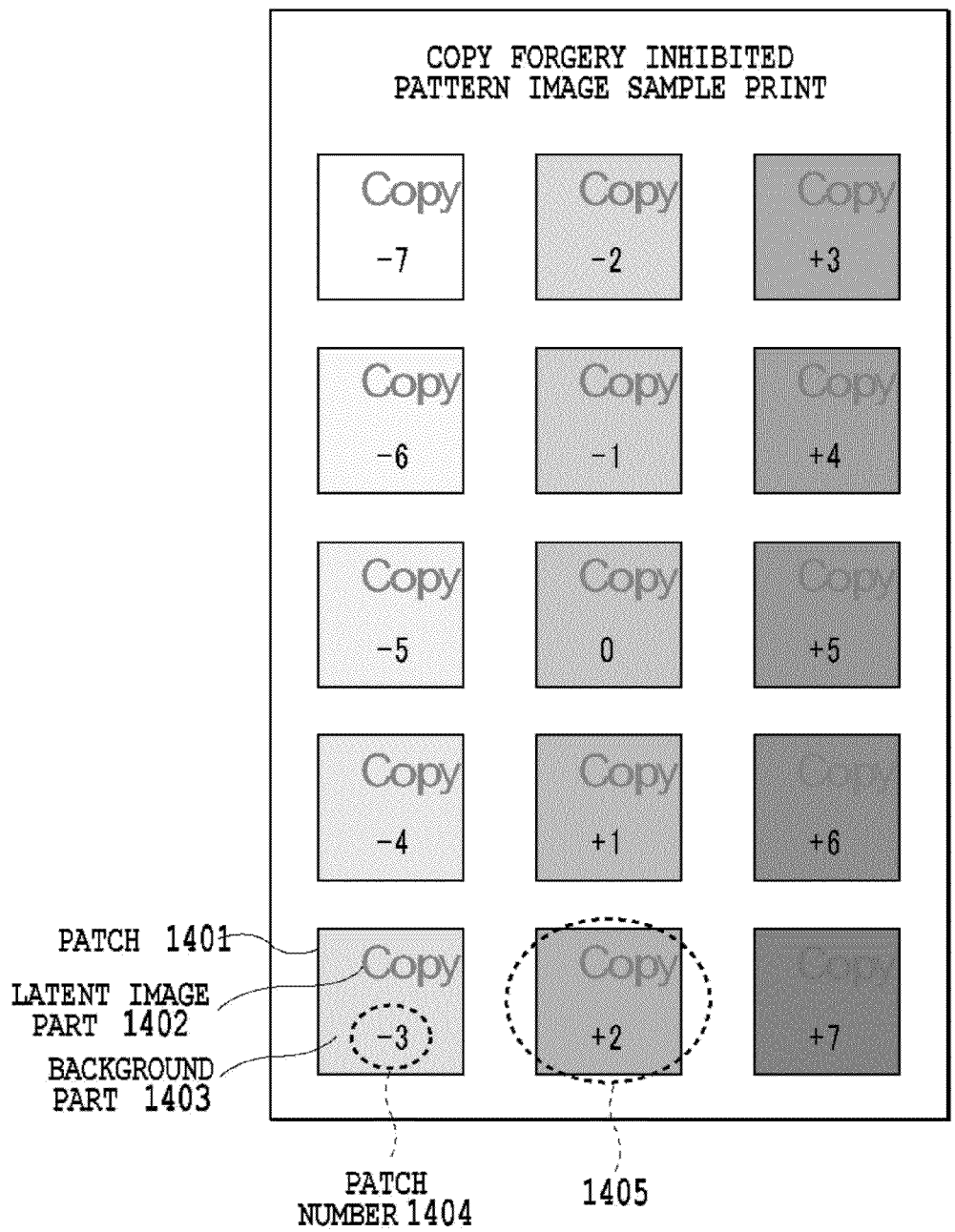
FIG. 14 is a diagram showing an example of a copy forgery inhibited pattern image sample sheet generated in a copy forgery inhibited pattern image sample generation unit 305 according to Embodiment 1 of the present invention.

FIG. 14 is a diagram showing an example of the copy forgery inhibited pattern image sample sheet generated in the copy forgery inhibited pattern image sample generation unit 305. As shown in FIG. 14, each of the patches 1401 is configured to include the latent image part 1402, the background part 1403, and a patch number 1404. In each of the patches in FIG. 14, the character part is the latent image part and the character peripheral part is the background part.

In the copy forgery inhibited pattern image sample sheet shown in FIG. 14, the plural copy forgery inhibited pattern image patches generated through the use of the gradation level of the latent image pattern and the gradation level of the background pattern, which are stored in the copy forgery inhibited pattern image sample data setting information unit 1301, are arranged side by side. Furthermore, in the copy forgery inhibited pattern image sample sheet shown in FIG. 14, the gradation level of the background pattern is changed so as to become lower or higher in a predetermined direction of the sheet, by the step level of the gradation levels for the background pattern which is stored in the copy forgery inhibited pattern image sample data setting information unit 1301.

A user checks the copy forgery inhibited pattern image sample sheet, selects information (that is, patch number 1404 or the like printed near the patch) about the patch in which the density of the latent image part and the density of the background part coincide with each other, and inputs the information from the operation unit 102 as selection information. The latent image pattern and the background pattern of the copy forgery inhibited pattern image based on the input selection information are stored in the HDD as the copy forgery inhibited pattern image information 306.

In the copy forgery inhibited pattern image sample sheet of FIG. 14, the density of the latent image pattern and the density of the background pattern coincides with each other in the patch 1405 having patch number +2, and thus the selection information is patch number +2.

(Density of the Copy Forgery Inhibited Pattern Image)

Next, the density of the copy forgery inhibited pattern image will be explained.

Figure 15:
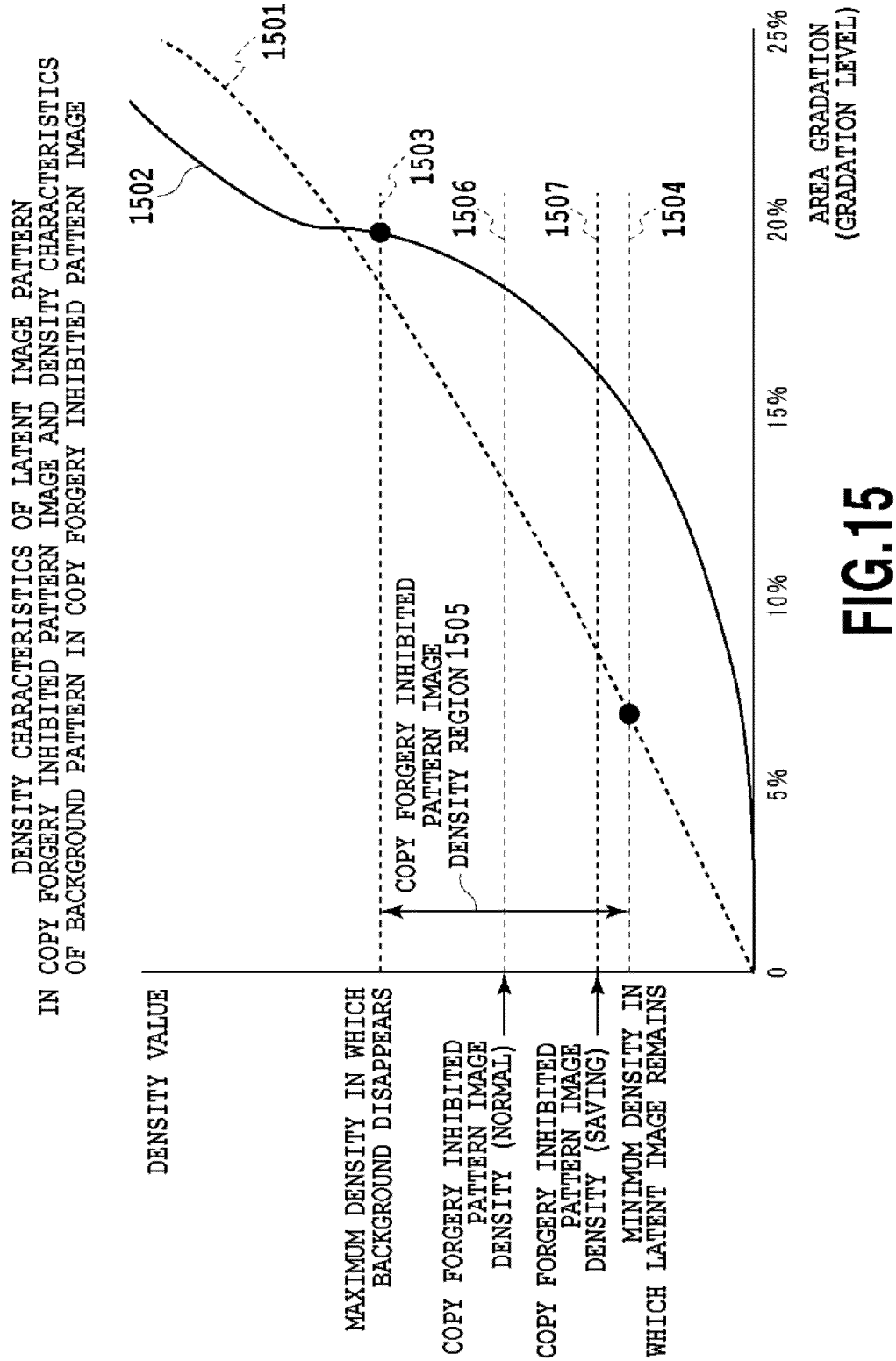
FIG. 15 is a graph showing an example of density characteristics of a latent image pattern in a copy forgery inhibited pattern image and density characteristics of a background pattern in the copy forgery inhibited pattern image according to Embodiment 1 of the present invention.

FIG. 15 is a diagram showing an example of density characteristics of the latent image pattern in the copy forgery inhibited pattern image and density characteristics of the background pattern in the copy forgery inhibited pattern image.

As shown in FIG. 15, the density characteristics of the latent image pattern 1501 (broken line) which are configured with concentrated-type dots have characteristics in which the density becomes higher gradually. Furthermore, the density characteristics of the background pattern 1502 (solid line) which is configured with dispersed-type dots has characteristics in which the density becomes higher slowly first and rapidly from a point where the density starts to become higher.

In these density characteristics, a density region between the maximum density 1503 in which the background pattern disappears at the time of duplication and the minimum density 1504 in which the latent image pattern remains at the time of the duplication is a density region (called "copy forgery inhibited pattern image density region in the present specification) 1505 which can be applied as a region for the copy forgery inhibited pattern image density.

The density of the copy forgery inhibited pattern image is set so as to have a density value approximately at the center of the copy forgery inhibited pattern image density region 1505. This is because, even in the case where density fluctuation is generated due to the engine characteristics of the printer or the printing environment, the density of the copy forgery inhibited pattern image is configured not to have a density value outside the copy forgery inhibited pattern image density region. The latent image pattern having a gradation level at which the density of the copy forgery inhibited pattern image has a density value approximately at the center of the copy forgery inhibited pattern image density region 1505 is set as the latent image pattern of the copy forgery inhibited pattern image in a normal mode. Furthermore, the background pattern having a gradation level at which the density of the copy forgery inhibited pattern image has a density value approximately at the center of the copy forgery inhibited pattern image density region 1505 is set as the background pattern of the copy forgery inhibited pattern image in the normal mode.

Moreover, a density value lower than the density of the above-mentioned copy forgery inhibited pattern image (that is, a density value approximately at the center of the copy forgery inhibited pattern image density region 1505) is set as a second copy forgery inhibited pattern image density. The second copy forgery inhibited pattern image density is a copy forgery inhibited pattern image density to be added in the printing of a lower density image in a saving mode or the like. As the second copy forgery inhibited pattern image density, there is set a copy forgery inhibited pattern image density 1507 in the saving mode, having a density value which is within the copy forgery inhibited pattern image density region 1505 and which also does not cause lowering of the visibility of an image having a low density. The latent image pattern having a gradation level at which the copy forgery inhibited pattern image density has the second copy forgery inhibited pattern image density value is set as the latent image pattern of the copy forgery inhibited pattern image in the saving mode. In addition, the background pattern having a gradation level at which the copy forgery inhibited pattern image density has the second copy forgery inhibited pattern image density value is set as the background pattern of the copy forgery inhibited pattern image in the saving mode.

Density adjustment between the latent image pattern and the background pattern in the saving mode is performed by setting the latent image pattern in the saving mode and by determining the background pattern through the use of the copy forgery inhibited pattern image sample print in the copy forgery inhibited pattern image density adjustment function.

Meanwhile, the latent image pattern and the background pattern in the normal mode and the latent image pattern and the background pattern in the saving mode are stored in the HDD 204 as the copy forgery inhibited pattern image information 306.

(Saving Mode)

Next the saving mode will be explained.

The saving mode is a mode for reducing the consumption amounts of toner and ink by making the image density lower than that in the normal mode.

Figure 16:
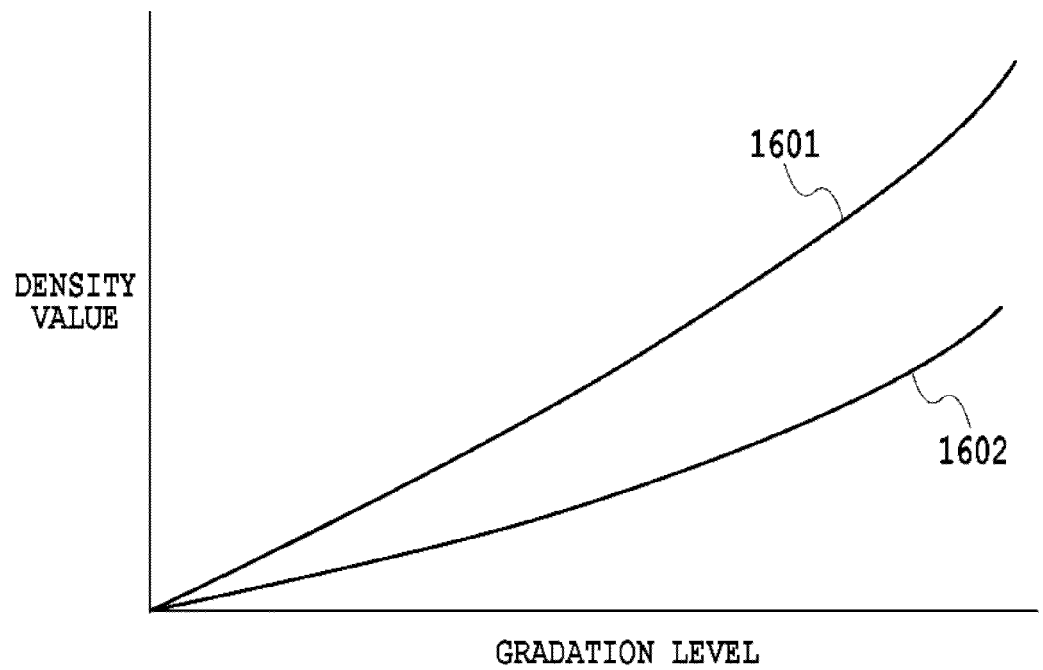
FIG. 16 is a graph showing an example of gradation characteristics in a normal mode and gradation characteristics in a saving mode according to Embodiment 1 of the present invention.

FIG. 16 is a diagram showing an example of gradation characteristics in the normal mode and gradation characteristics in the saving mode. In FIG. 16, the vertical axis shows a density value and the horizontal axis shows a gradation level.

In the examples shown in FIG. 16, the density value of the gradation characteristics 1602 in the saving mode is suppressed so as to be approximately half the density value of the gradation characteristics 1601 in the normal mode, at an arbitrary gradation level. Since the density value becomes approximately a half, it becomes possible to reduce the consumption of toner considerably.

Figure 17:
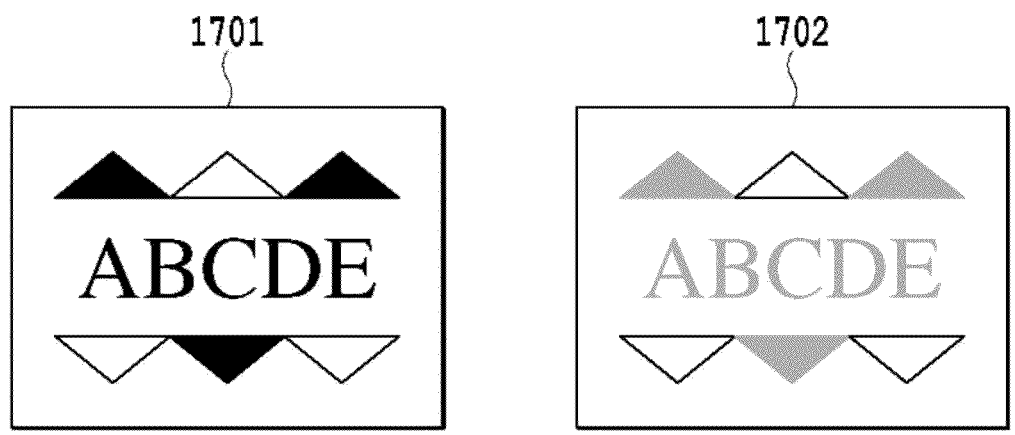
FIG. 17 is a diagram showing an example of an output image in a normal mode and an output image in a saving mode according to Embodiment 1 of the present invention.

FIG. 17 is a diagram showing an example of an output image in the normal mode and an output image in the saving mode.

The output image 1702 in the saving mode is generated by applying the gradation characteristics 1602 in the saving mode to the input image. The output image 1702 in the saving mode has a lower density as a whole than the output image 1701 in the normal mode. However, in the output image 1702 in the saving mode, since a character or a graphic can be recognized and the outline of an image can be comprehended, it is possible to suppress the consumption of toner while keeping the visibility in a trial printing or a document having only characters.

(Generation of the Latent Image Pattern and the Background Pattern in the Saving Mode)

Next, there will be explained setting of the latent image pattern and the background pattern in the copy forgery inhibited pattern image information 306 in the saving mode.

Figure 18:
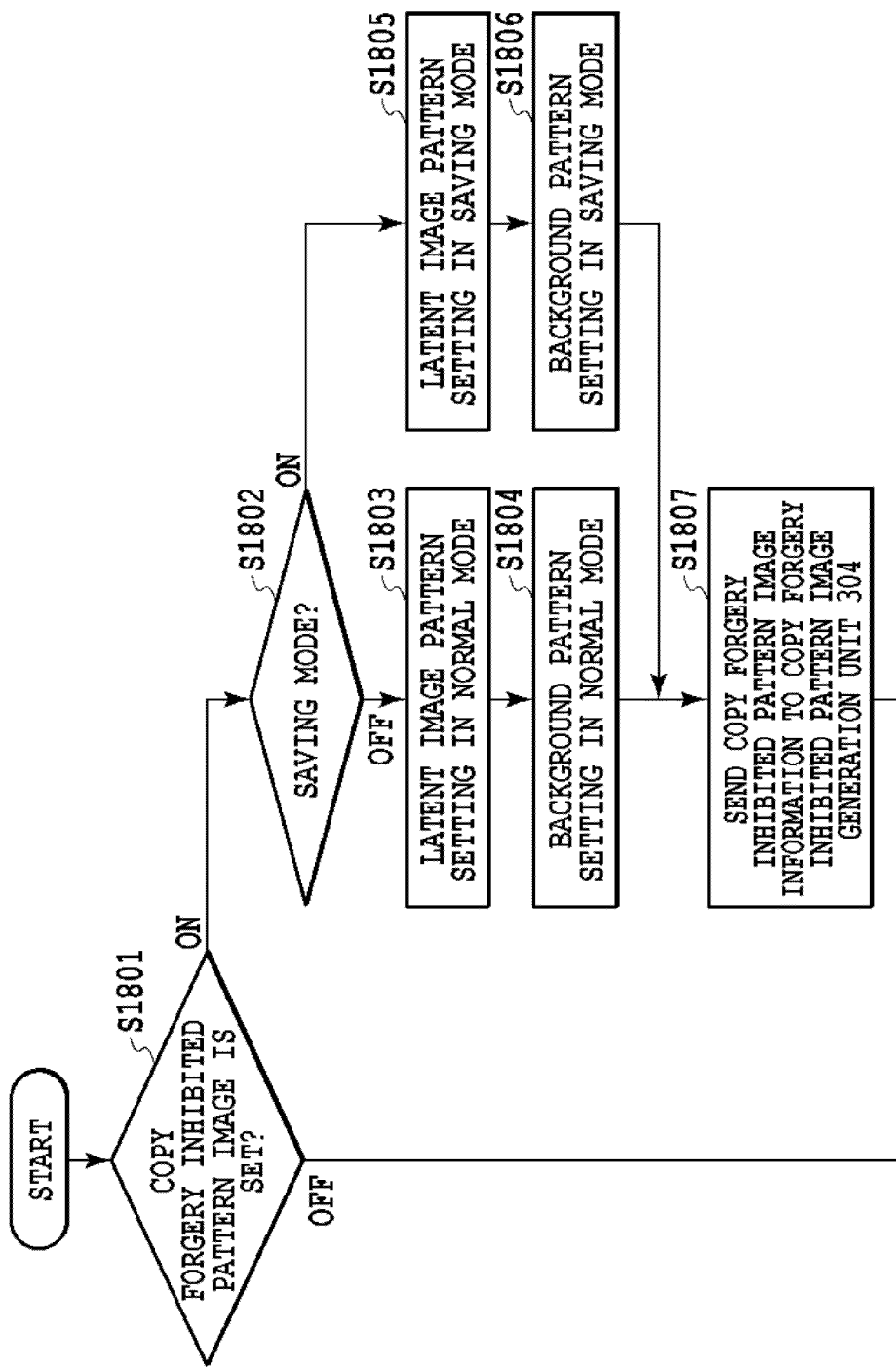
FIG. 18 is a flowchart showing a generation sequence of a latent image pattern and a background pattern according to Embodiment 1 of the present invention.

FIG. 18 is a flowchart showing a generation sequence of the latent image pattern and the background pattern in the copy forgery inhibited pattern image information 306.

First, in step S1801, the CPU 201 determines whether or not the copy forgery inhibited pattern image addition mode is set. In the case where the copy forgery inhibited pattern image addition mode is determined to be set, the process goes to step S1802, and in the case where the copy forgery inhibited pattern image addition mode is determined not to be set, the process is finished.

In step S1802, the CPU 201 determines whether or not the saving mode is set. In the case where the saving mode is determined to be set, the process goes to step S1805, and, in the case where the saving mode is determined not to be set, the process goes to step S1803.

In step S1803, the CPU 201 sets a latent image pattern in the normal mode as the latent image pattern of the copy forgery inhibited pattern image information 306. Next, the process goes to step S1804.

In step S1804, the CPU 201 sets a background pattern in the normal mode as the background pattern of the copy forgery inhibited pattern image information 306. Next the process goes to step S1807.

In step S1805, the CPU 201 sets a latent image pattern in the saving mode which has a lower density than the latent image pattern in the normal mode, as the latent image pattern of the copy forgery inhibited pattern image information 306. Next, the process goes to step S1806.

In step S1806, the CPU 201 sets a background pattern in the saving mode which has a lower density than the background pattern in the normal mode, as the background pattern of the copy forgery inhibited pattern image information 306. Next the process goes to step S1807.

In step S1807, the CPU 201 sends the copy forgery inhibited pattern image information 306 to the copy forgery inhibited pattern image generation unit 304, and the process is finished.

As described above, by adding a copy forgery inhibited pattern image having a lower density in the saving mode to the image to which the copy forgery inhibited pattern image is to be added, it becomes possible to reduce the consumption amounts of toner, ink, and the like and to reduce the running cost of the printing device, while keeping the effectiveness of the copy forgery inhibited pattern image which suppresses the duplication.

Furthermore, by adding the copy forgery inhibited pattern image having a lower density, it becomes possible to keep a density difference between the copy forgery inhibited pattern image and the image in the saving mode and to suppress the lowering of the image visibility.

Embodiment 2

A second embodiment (Embodiment 2) of the present invention will be explained. In Embodiment 1, the density adjustment, in the saving mode, between the latent image pattern and the background pattern is set using the copy forgery inhibited pattern image sample print in the same way as in the normal mode. However, in the method of Embodiment 1, since both of the copy forgery inhibited pattern image sample print for the normal mode and the copy forgery inhibited pattern image sample print for the saving mode become necessary, the number of copy forgery inhibited pattern image samples required increases and labor power for the setting also increases.

Accordingly, in the present embodiment, there will be explained the ground sample print capable of setting the normal mode and the saving mode at the same time.

Figure 19:
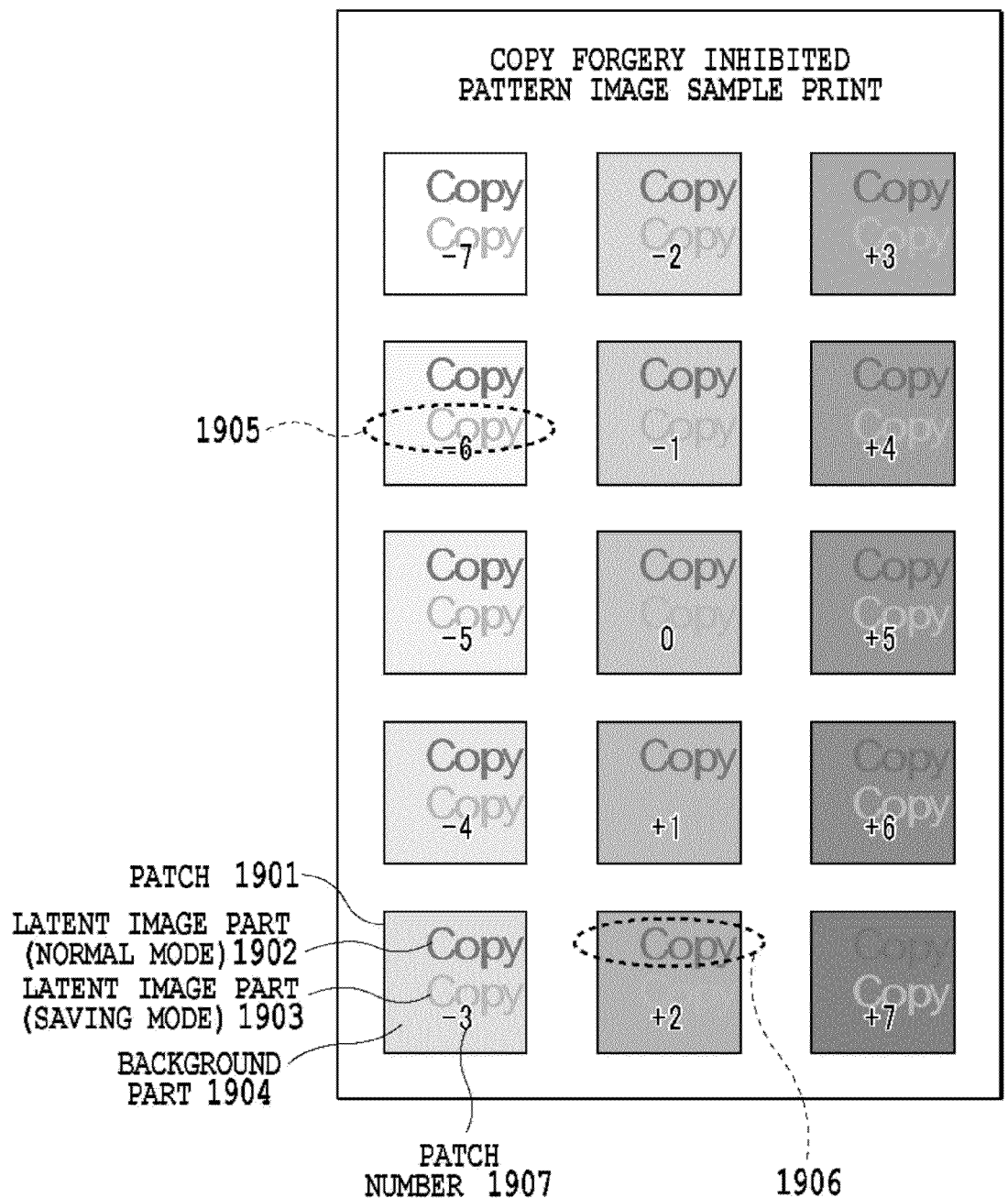
FIG. 19 is a diagram showing an example of a copy forgery inhibited pattern image sample sheet in which a normal mode and a saving mode can be set at the same time according to Embodiment 2 of the present invention.

FIG. 19 is a diagram showing an example of the copy forgery inhibited pattern image sample sheet in which the normal mode and the saving mode can be set at the same time. As shown in FIG. 19, each of the patches 1901 is configured to include the latent image part 1902 in the normal mode, the latent image part 1903 in the saving mode, the background part 1904, and a patch number 1907. In each of the patches in FIG. 19, the character parts are the latent image parts, the character part in the upper row is the latent image part in the normal mode, the character part in the lower row is the latent image part in the saving mode, and the character peripheral part is the background part.

In FIG. 19, there are arranged side by side the plural patches 1901 generated through the use of the gradation level of the latent image pattern in the normal mode, the gradation level of the latent image pattern in the saving mode, and the gradation level of the background pattern, the gradation level of which being stored in the copy forgery inhibited pattern image sample data setting information unit 1301. Furthermore, in each of the patches, the latent image pattern is fixed (in the example shown in FIG. 19, fixed to "Copy"). Moreover, the gradation level of the background pattern is changed so as to become lower or higher in a predetermined direction by the step level of the gradation level in the background pattern, the gradation level of which being stored in the copy forgery inhibited pattern image sample data setting information unit 1301.

The user checks the copy forgery inhibited pattern image sample sheet, selects information (that is, patch number 1907 or the like printed near the patch) about a patch in which the density of the latent image part 1902 in the normal mode and the density of the background part 1904 coincides with each other, and inputs the information from the operation unit 102 as the selection information. The latent image pattern and the background pattern of the copy forgery inhibited pattern image based on the input selection information is input into the HDD as the copy forgery inhibited pattern image information 306 in the normal mode.

Moreover, the user checks the copy forgery inhibited pattern image sample sheet, selects information about a patch in which the density of the latent image part 1903 in the saving mode and the density of the background part 1904 coincide with each other, and inputs the information from the operation unit 102 as the selection information. The latent image pattern and the background pattern of the copy forgery inhibited pattern image based on the input selection information are stored in the HDD as the copy forgery inhibited pattern image information 306 in the saving mode.

In the example shown in FIG. 19, the density of the latent image pattern in the upper row coincides with the density of the background pattern, in the patch 1906 of patch number +2. Accordingly, the selection information selected through the user in the setting of the normal mode is patch number +2. Moreover, in the patch 1905 of patch number −6, the density of the latent image pattern in the lower row coincides with the density of the background pattern. Accordingly, the selection information selected through the user in the setting of the saving mode is patch number −6.

As described above, by using the copy forgery inhibited pattern image print in which the normal mode and the saving mode can be set at the same time, it is possible to suppress the increase in the number of the copy forgery inhibited pattern image sample print and to simply perform the setting of the normal mode and the saving mode.

Embodiment 3

A third embodiment (Embodiment 3) of the present invention will be explained. In Embodiment 1 and Embodiment 2, the latent image pattern and the background pattern are set to have lower densities in the saving mode than in the normal mode. However, there is a case where the density of the copy forgery inhibited pattern image is low in the saving mode, the number of dots to be concentrated becomes reduced even in the latent image pattern obtained by using the dot concentration-type dither matrix, and the density of the latent image pattern becomes unstable at the time of the duplication.

As an example, there will be examined a case where the dot configuration of the latent image pattern in the normal mode is the configuration shown by the pattern 703 of FIG. 7 and the dot configuration of the latent image pattern in the saving mode is the configuration shown by the pattern 701 of FIG. 7. In this case, while the dots concentrated at the center are configured with nine dots (pixels) in the dot configuration 703 of the latent image pattern in the normal mode, the dots concentrated at the center are configured with four dots in the dot configuration 701 of the latent image pattern having a lower density in the saving mode.

The number of concentrated dots becomes smaller in the latent image pattern in the saving mode than in the latent image pattern in the normal mode. Therefore, the latent image pattern in the saving mode easily receives influence of the density fluctuation caused by the change in the printing environment or the like, and there is a case where the density thereof goes out of the copy forgery inhibited pattern image density region 1505 and the latent image pattern does not remain at the time of the duplication.

Accordingly, in the present embodiment, there will be explained a means of stabilizing the density of the latent image pattern for the saving mode at the time of the duplication.

FIG. 20 is a diagram showing an example of a 16×16 dot concentration-type dither matrix for the saving mode. In the dither matrix shown in FIG. 20, the threshold pattern is designed so as to cause the dots to be concentrated at the center and the four corners. In the dither matrix shown in FIG. 20, the number of screen lines becomes a half of that in the dither matrix shown in FIG. 6. Here, in the dither matrix shown in FIG. 20, compared with the dither matrix shown in FIG. 6, the number of gradations is expanded two times to be 0 to 127. In order to match the dither matrix shown in FIG. 6 with the dither matrix shown in FIG. 20, the number of threshold values may be doubled.

Figure 21:
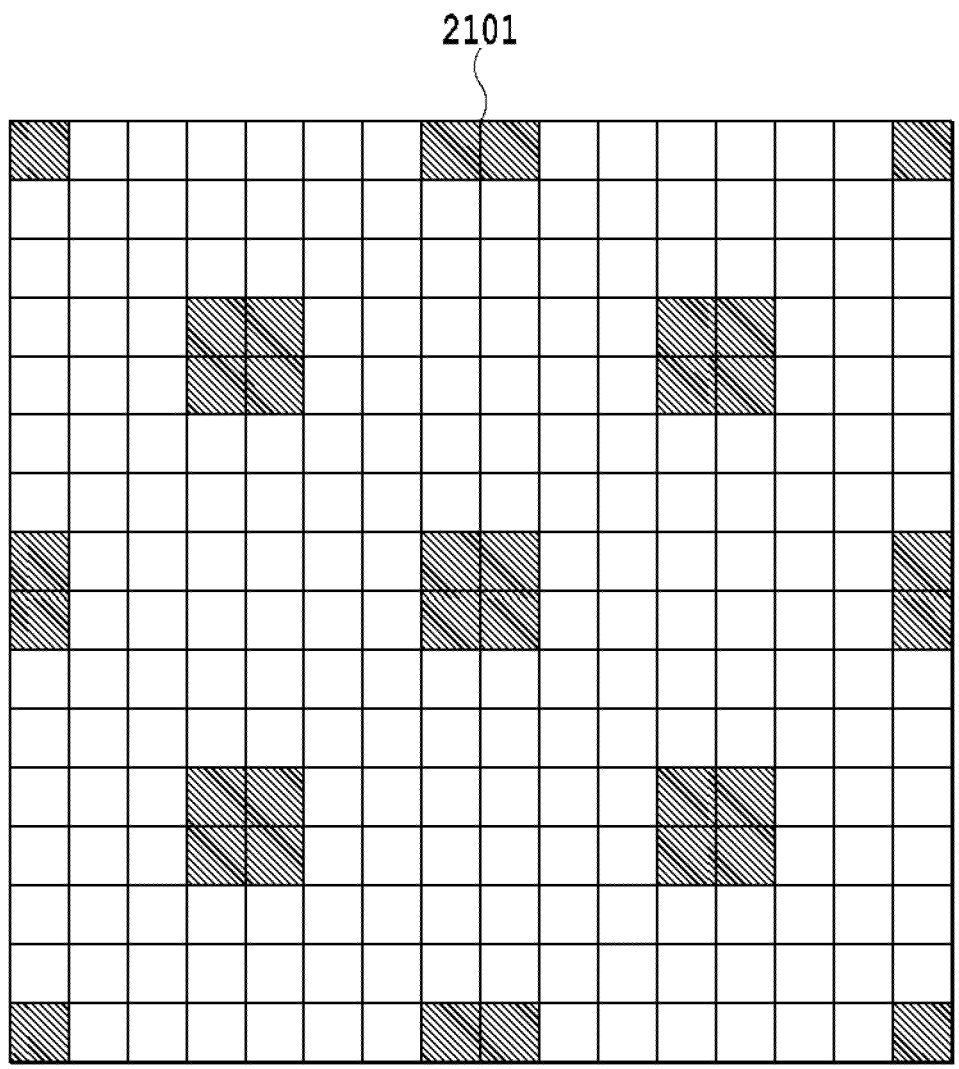
FIG. 21 shows a dot configuration of a latent image pattern generated through the use of an 8×8 dither matrix for explaining Embodiment 3 of the present invention.

FIG. 21 shows a dot configuration of the latent image pattern generated using the 8×8 dither matrix shown in FIG. 6. The dot configuration 2101 of the latent image pattern is configured with four pieces of the dot configuration 701 shown in FIG. 7 for the latent image pattern (two pieces in the vertical direction and two pieces in the horizontal direction).

Figure 22:
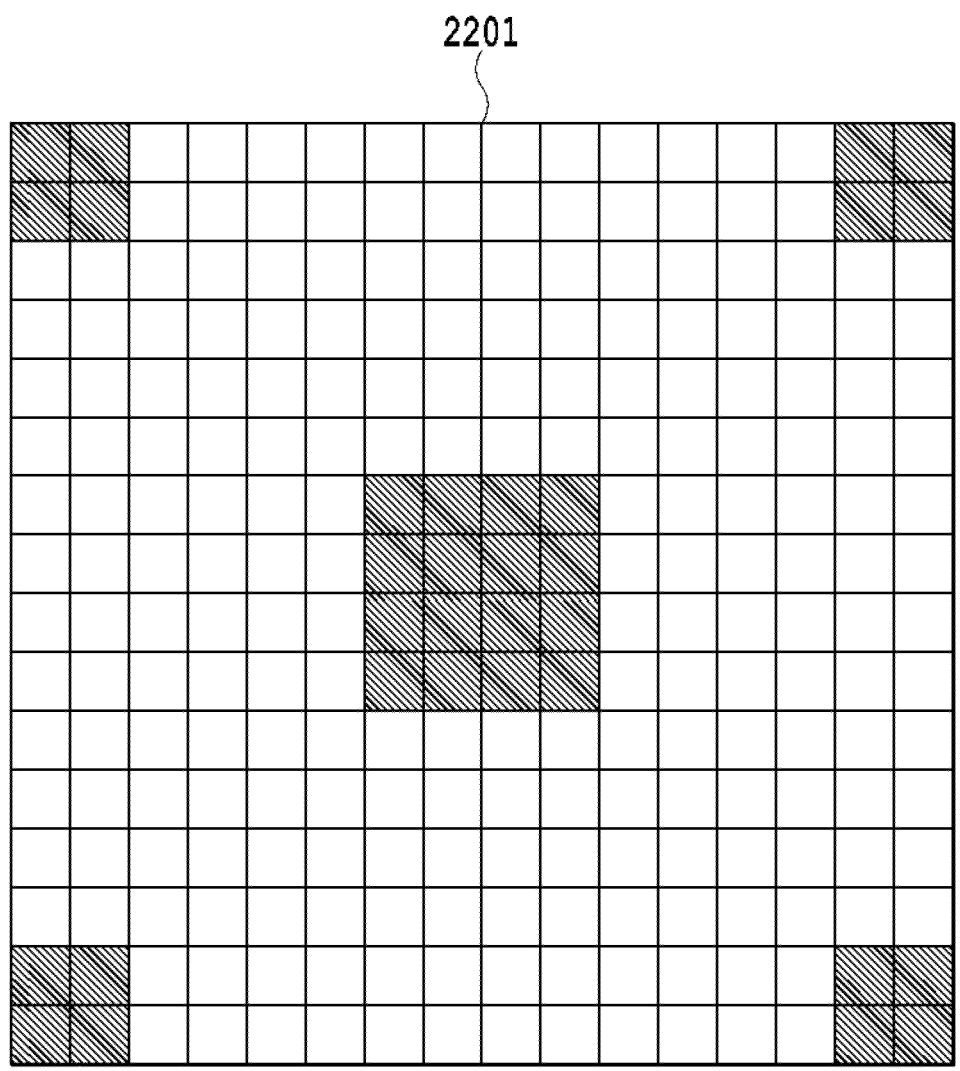
FIG. 22 shows a dot configuration of a latent image pattern generated through the use of a 16×16 dither matrix for explaining Embodiment 3 of the present invention.

FIG. 22 is a dot configuration of the latent image pattern generated using the 16×16 dither matrix shown in FIG. 20. The dot configuration 2201 of the latent image pattern is obtained by the threshold processing through the use of the input image signal having the same gradation level as that for the dot configuration 701 of the latent image pattern shown in FIG. 7.

The number of dots concentrated at the center is four in the dot configuration 2101 shown in FIG. 21, the configuration being generated using the dither matrix shown in FIG. 6. In contrast, in the dot configuration 2201 is shown in FIG. 22 which is generated using the dither matrix shown in FIG. 20, the number of dots concentrated at the center is 16, although the gradation level is the same as that in the dot configuration 2101 shown in FIG. 21.

In this manner, in the case where the dither matrix shown in FIG. 20 is used as the dither matrix in the saving mode in which the density is low, the number of dots concentrated at the center becomes larger even at the low density, and thus the influence of the density variation is hard to be received and the density of the latent image pattern is stabilized in the saving mode.

As described above, by using the dither matrix having a smaller number of screen lines in the saving mode than in the normal mode, it becomes possible to stabilize the density of the latent image pattern in the copy forgery inhibited pattern image having a low density.

Embodiment 4

A fourth embodiment (Embodiment 4) of the present invention will be explained. In Embodiment 3, the density of the latent image pattern is stabilized by means of generating the dot configuration of the latent image pattern by using the dither matrix having a smaller number of screen lines in the saving mode than in the normal mode. However, by the reduction of the number of screen lines, resolution in gradation expression is lowered and thus there is a case where a smaller character size in the latent image part makes it difficult to identify a character.

Accordingly, the size of a character in the latent image part which stands out as the copy forgery inhibited pattern image is increased in the saving mode, and thus it becomes possible to easily identify the character which stands out as the copy forgery inhibited pattern image, even in the case of using the dither matrix having a smaller number of screen lines.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-275785, filed Dec. 18, 2012, which is hereby incorporated by reference herein in its entirety.

What is claimed is:

1. An apparatus comprising:
a unit configured to determine whether or not a color material saving mode is set;
a unit configured
to cause a printing unit to print a large dot region by using a first value and a small dot region by using a second value, in a case where the color material saving mode is set, and
to cause the printing unit to print a large dot region by using a third value and a small dot region by using a fourth value, in a case where the color material saving mode is not set; and
a unit configured to cause the printing unit to print patches for setting the second value and the fourth value,
wherein
each of the patches includes the large dot region printed by using the first value and the large dot region printed by using the third value and a small dot region, and
a density of the small dot region in each of the patches is different from a density of the small dot region in each of the other patches.

2. The apparatus according to claim 1, further comprising:
a unit configured to set the second value and the fourth value through selection of two patches from the patches by a user performed after the printing of the patches.

3. The apparatus according to claim 1, wherein the patches are caused to be printed on one sheet by the printing unit.

4. A method comprising:
  determining whether or not a color material saving mode is set;
  in a case where the color material saving mode is set, causing a printing unit to print a large dot region by using a first value and a small dot region by using a second value;
  in a case where the color material saving mode is not set, causing the printing unit to print a large dot region by using a third value and a small dot region by using a fourth value; and
  causing the printing unit to print patches for setting the second value and the fourth value,
  wherein
    each of the patches includes the large dot region printed by using the first value and the large dot region printed by using the third value and a small dot region, and
    a density of the small dot region in each of the patches is different from a density of the small dot region in each of the other patches.

5. The method according to claim 4, further comprising:
  setting the second value and fourth value through selection of two patches from the patches by a user performed after printing of the patches.

6. The method according to claim 4, wherein the patches are caused to be printed on one sheet by the printing unit.

7. A non-transitory computer readable storage medium storing a program for causing a computer to execute the processes of:
  a determining unit configured to determine whether or not a color material saving mode is set;
  in a case where the color material saving mode is set, causing a printing unit to print a large dot region by using a first value and a small dot region by using a second value;
  in a case where the color material saving mode is not set, causing the printing unit to print a large dot region by using a third value and a small dot region by using a fourth value; and
  causing the printing unit to print patches for setting the second value and the fourth value,
  wherein
    each of the patches includes the large dot region printed by using the first value and the large dot region printed by using the third value and a small dot region, and
    a density of the small dot region in each of the patches is different from a density of the small dot region in each of the other patches.

* * * * *